(12) United States Patent
Wada et al.

(10) Patent No.: US 8,179,608 B2
(45) Date of Patent: May 15, 2012

(54) ZOOM LENS AND IMAGE PICKUP APPARATUS INCLUDING THE SAME

(75) Inventors: Ken Wada, Sakura (JP); Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 12/852,739

(22) Filed: Aug. 9, 2010

(65) Prior Publication Data

US 2011/0051257 A1    Mar. 3, 2011

(30) Foreign Application Priority Data

Aug. 31, 2009   (JP) .................................. 2009-199919

(51) Int. Cl.
*G02B 15/14*    (2006.01)
*G02B 17/00*    (2006.01)
(52) U.S. Cl. ........................................ 359/676; 359/726
(58) Field of Classification Search .................. 359/676, 359/726
See application file for complete search history.

(56) References Cited

U.S. PATENT DOCUMENTS

| | | | |
|---|---|---|---|
| 6,072,637 A * | 6/2000 | Okada et al. .................. | 359/676 |
| 6,333,823 B1 | 12/2001 | Ozaki et al. | |
| 2007/0014031 A1 | 1/2007 | Kohno et al. | |
| 2007/0091200 A1 | 4/2007 | Yamaguchi et al. | |

* cited by examiner

*Primary Examiner* — William Choi
(74) *Attorney, Agent, or Firm* — Canon U.S.A., Inc. IP Division

(57) ABSTRACT

A zoom lens includes, in order from an object side to an image side, first and second lens units respectively having positive and negative refractive powers, a reflecting prism for bending an optical path, and a rear lens group including lens units. At least the first and second lens units move for zooming. During retraction into a storage state, the prism moves to a position different from a position in an image taking state, and at least a part of the first and second lens units is retracted into a space formed by movement of the prism. Thicknesses of the first and second lens units, a moving amount of the first lens unit during zooming from a wide angle end to a telephoto end, a focal length of the first lens unit, and a focal length of the entire zoom lens at the telephoto end are set properly.

13 Claims, 17 Drawing Sheets

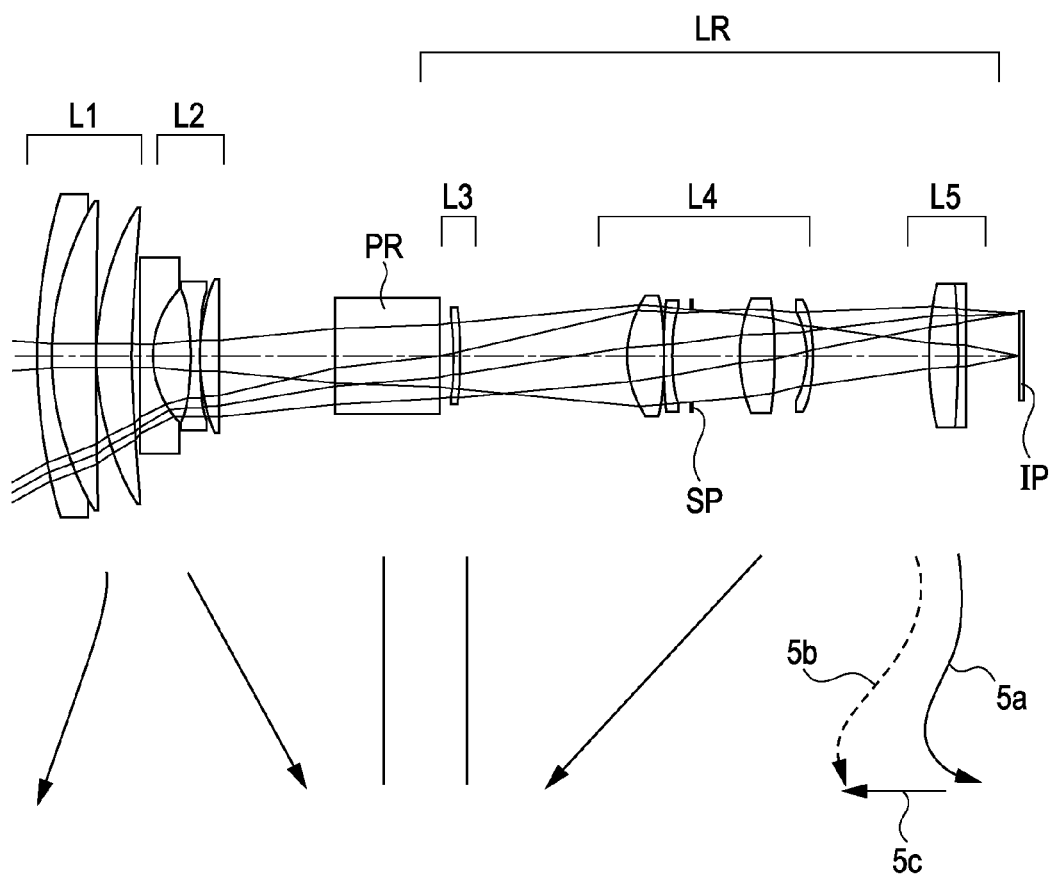

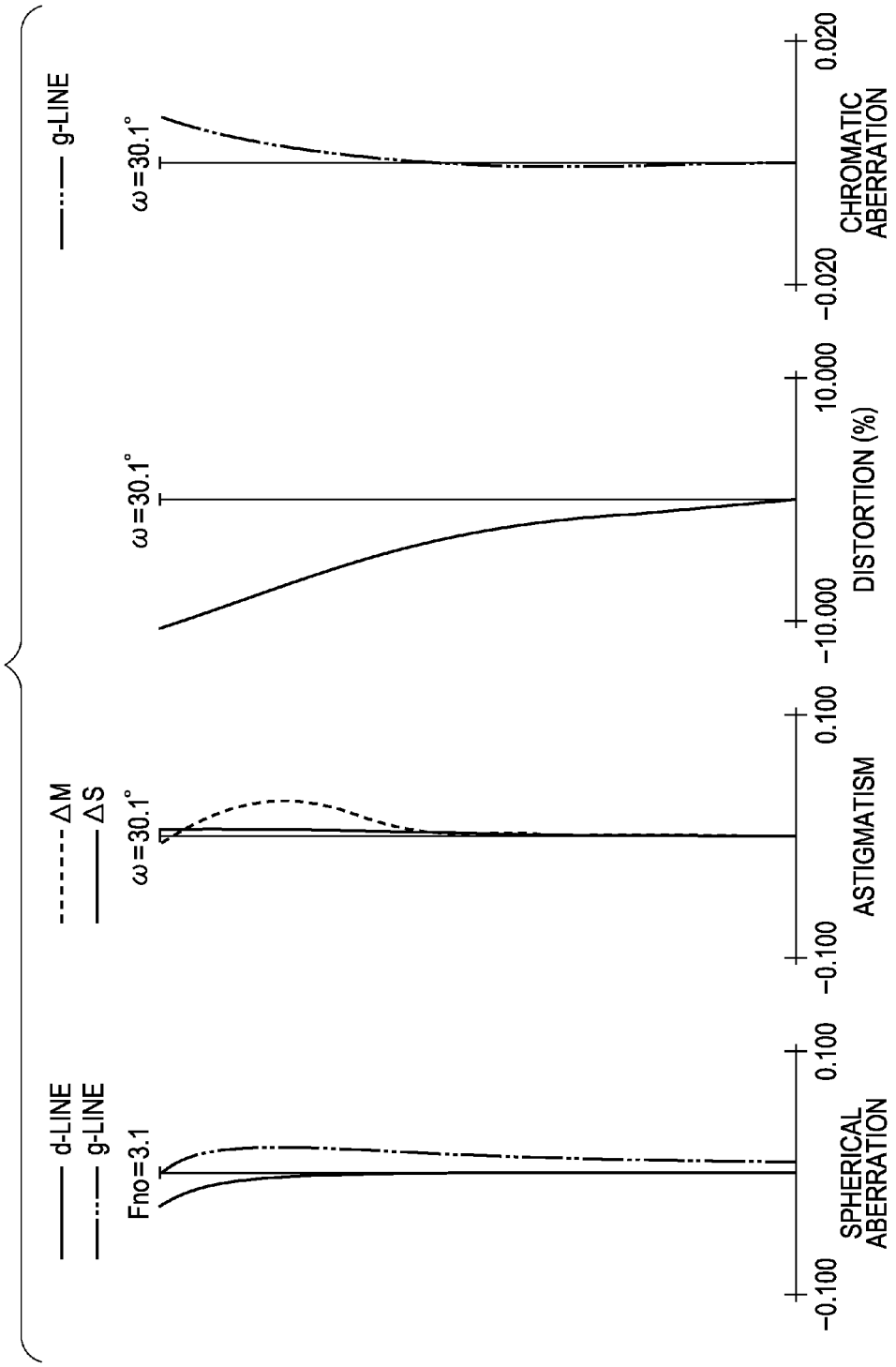

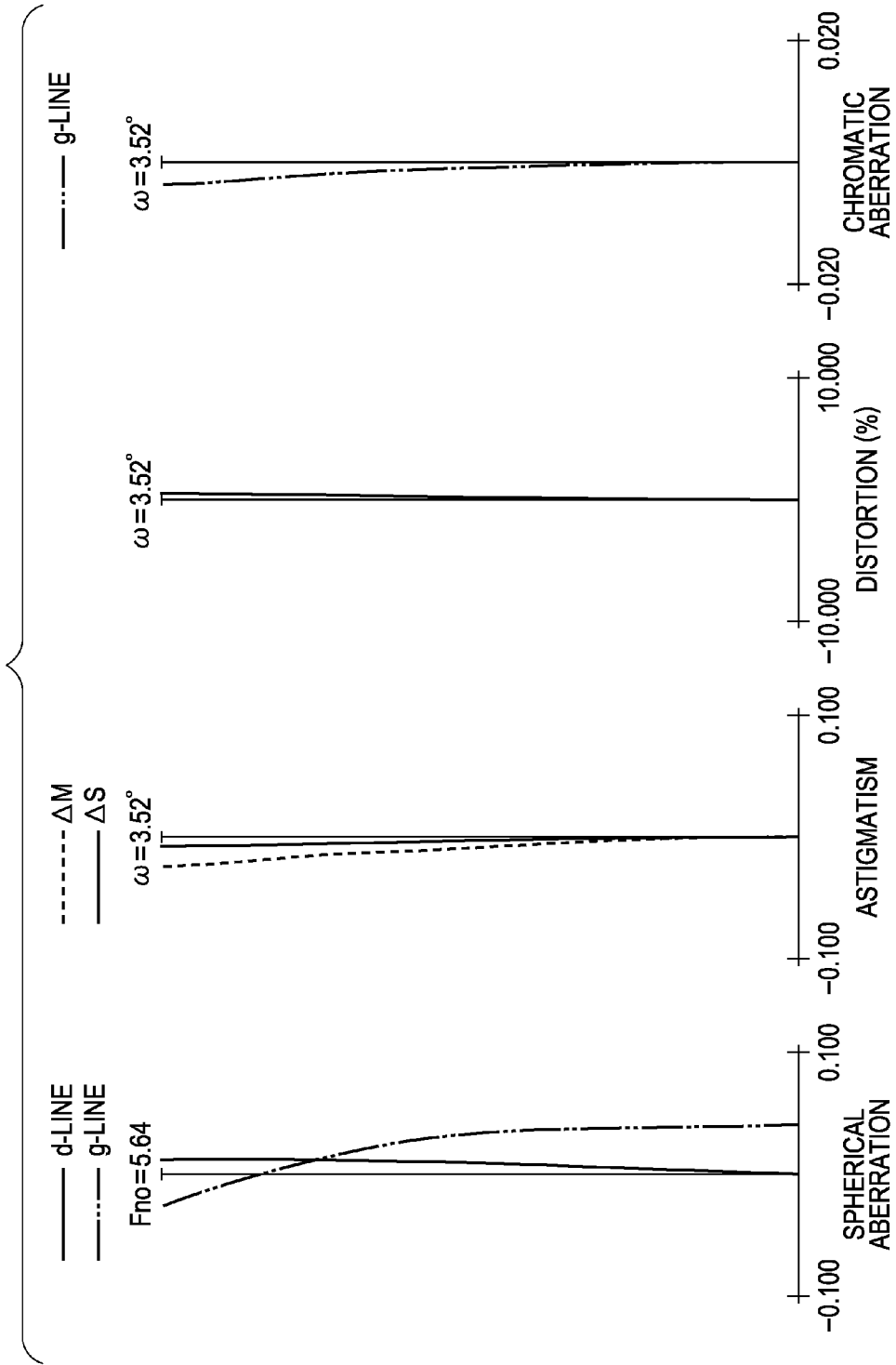

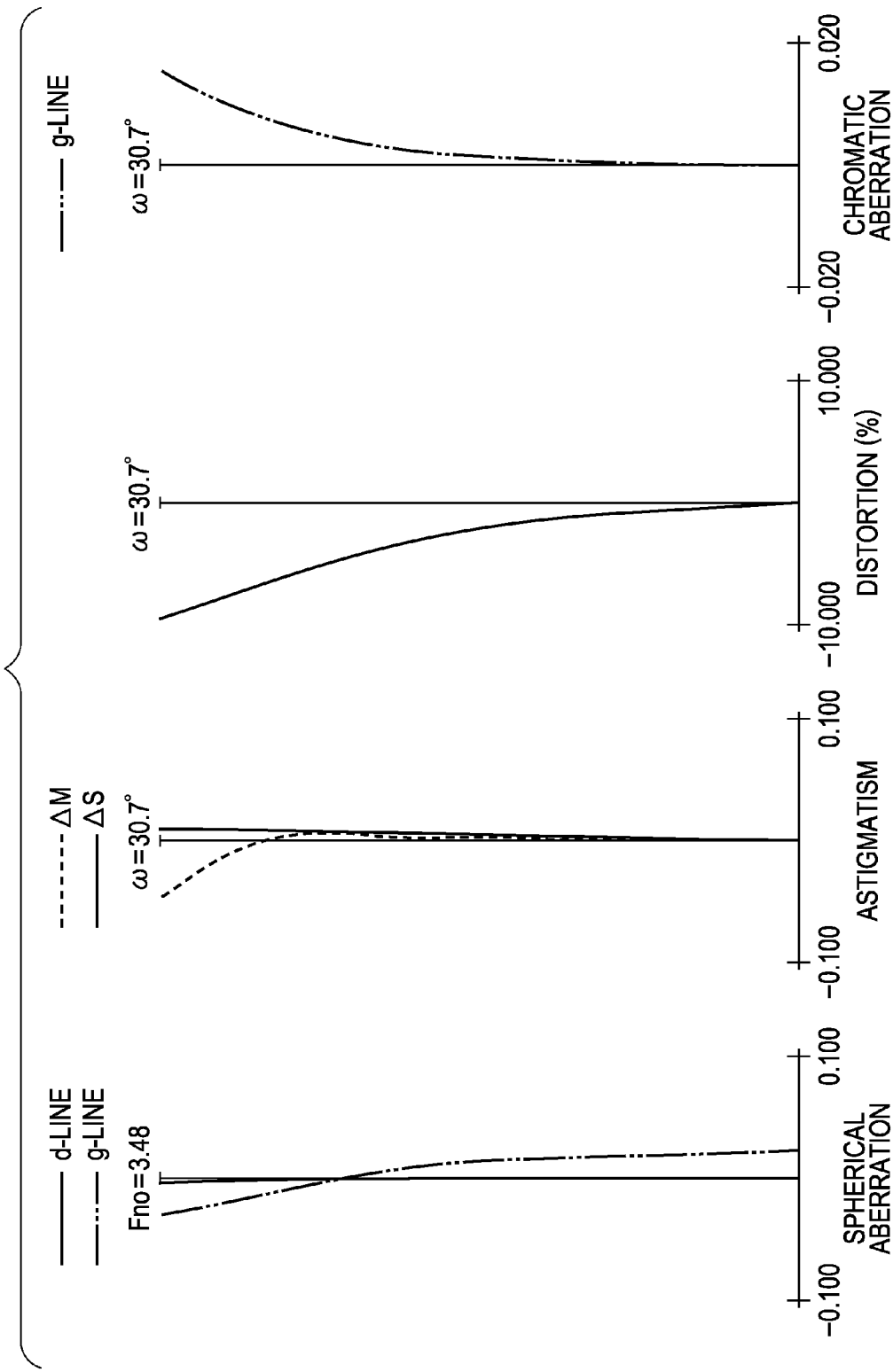

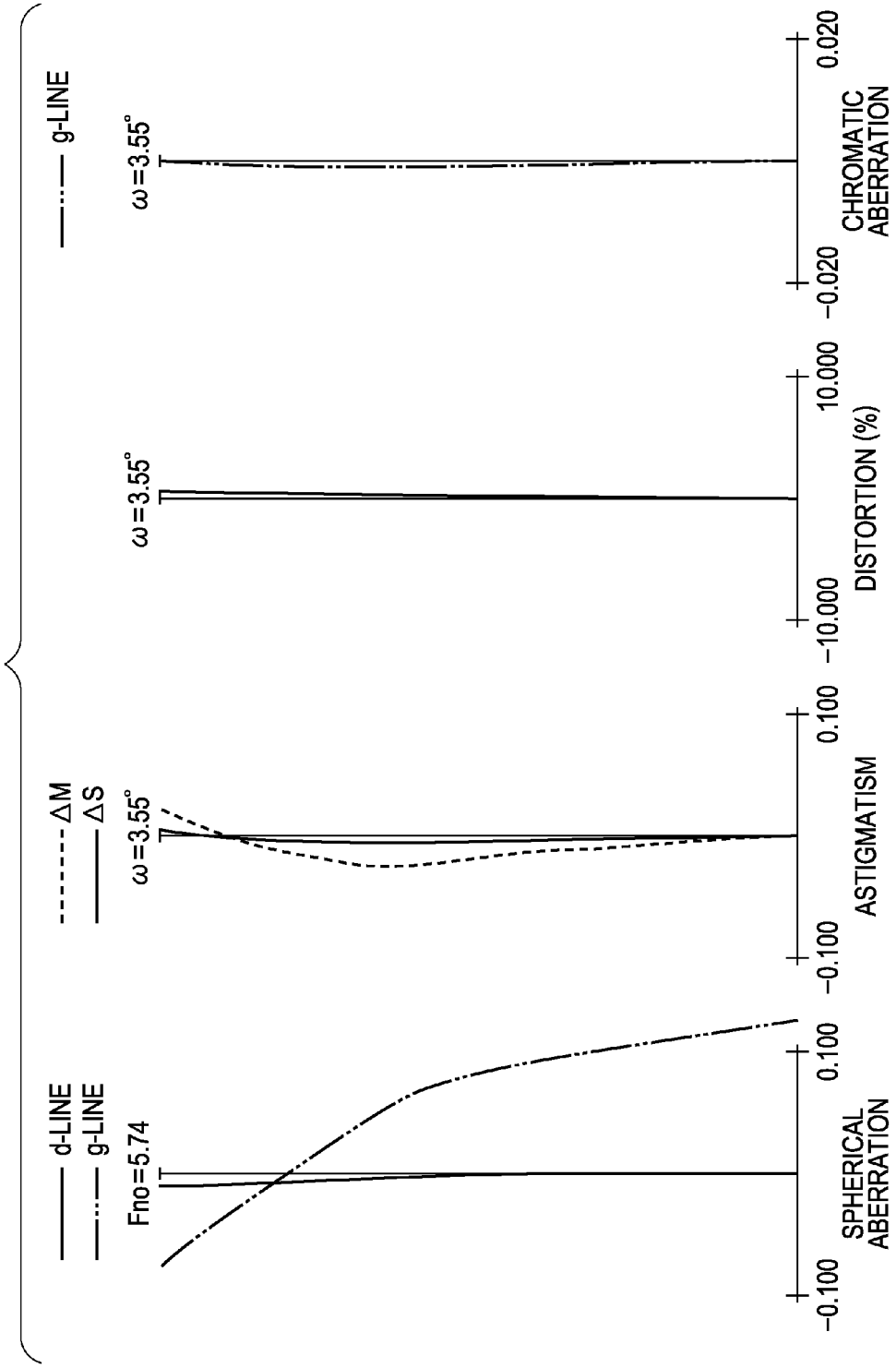

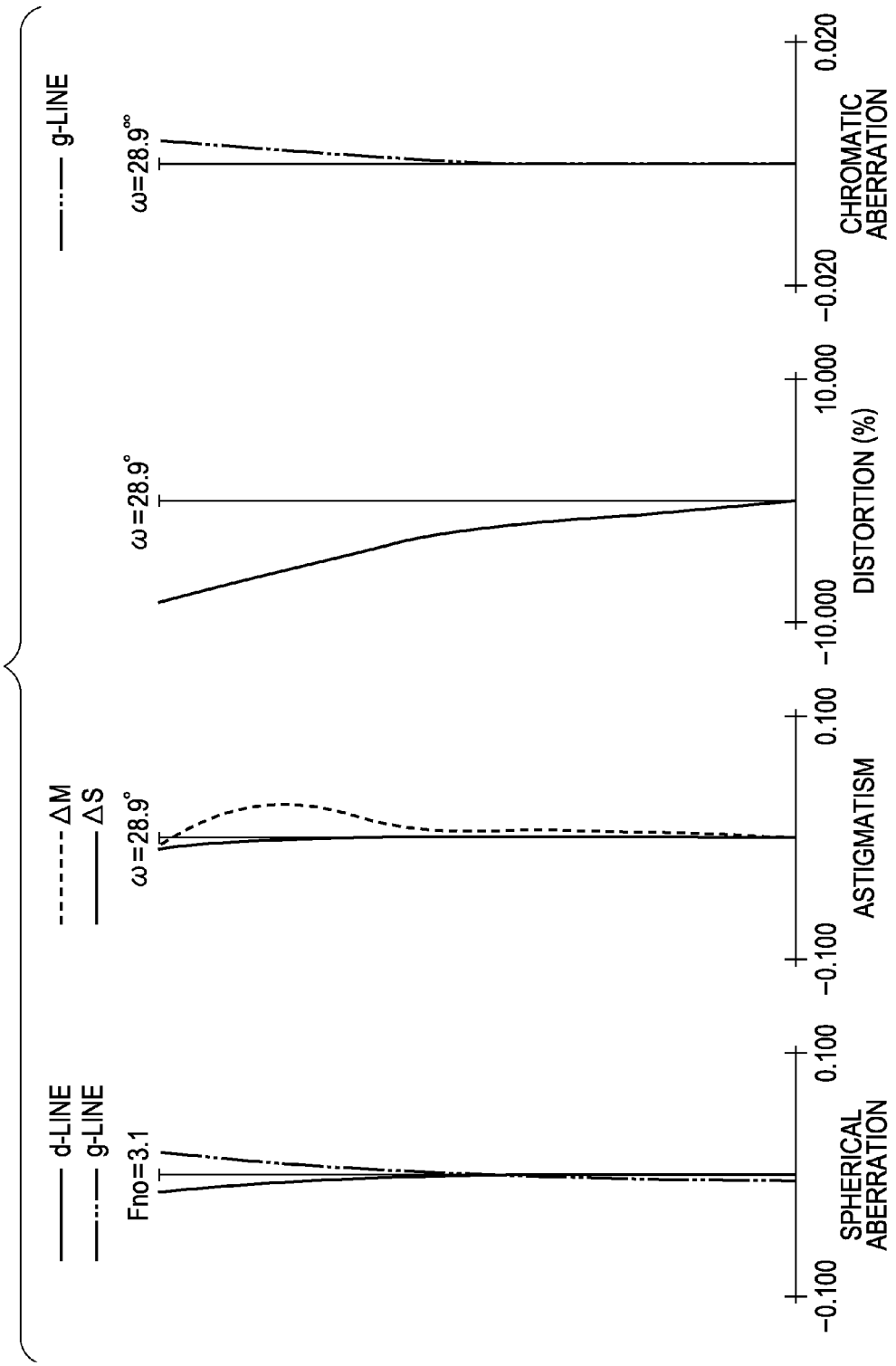

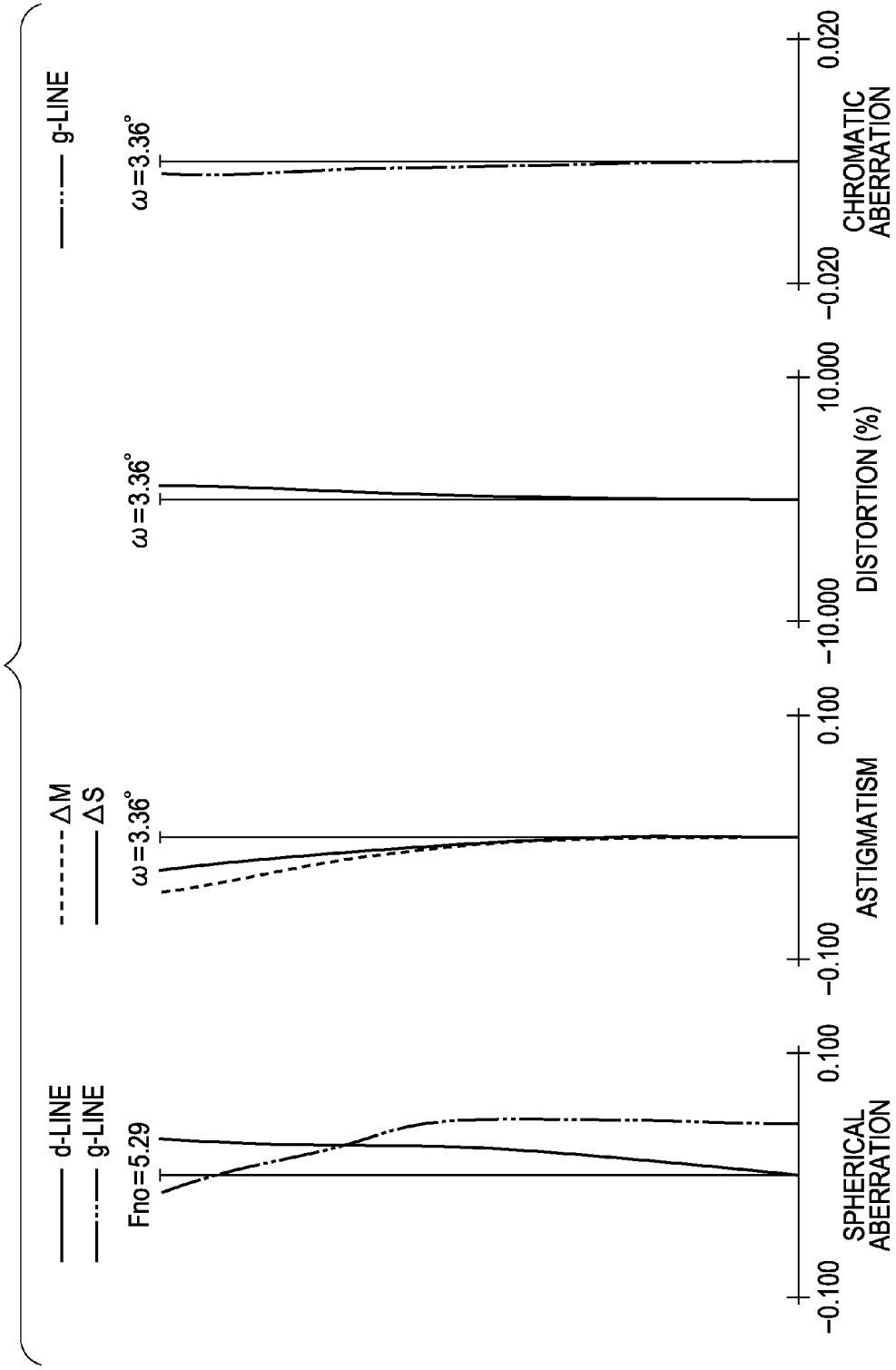

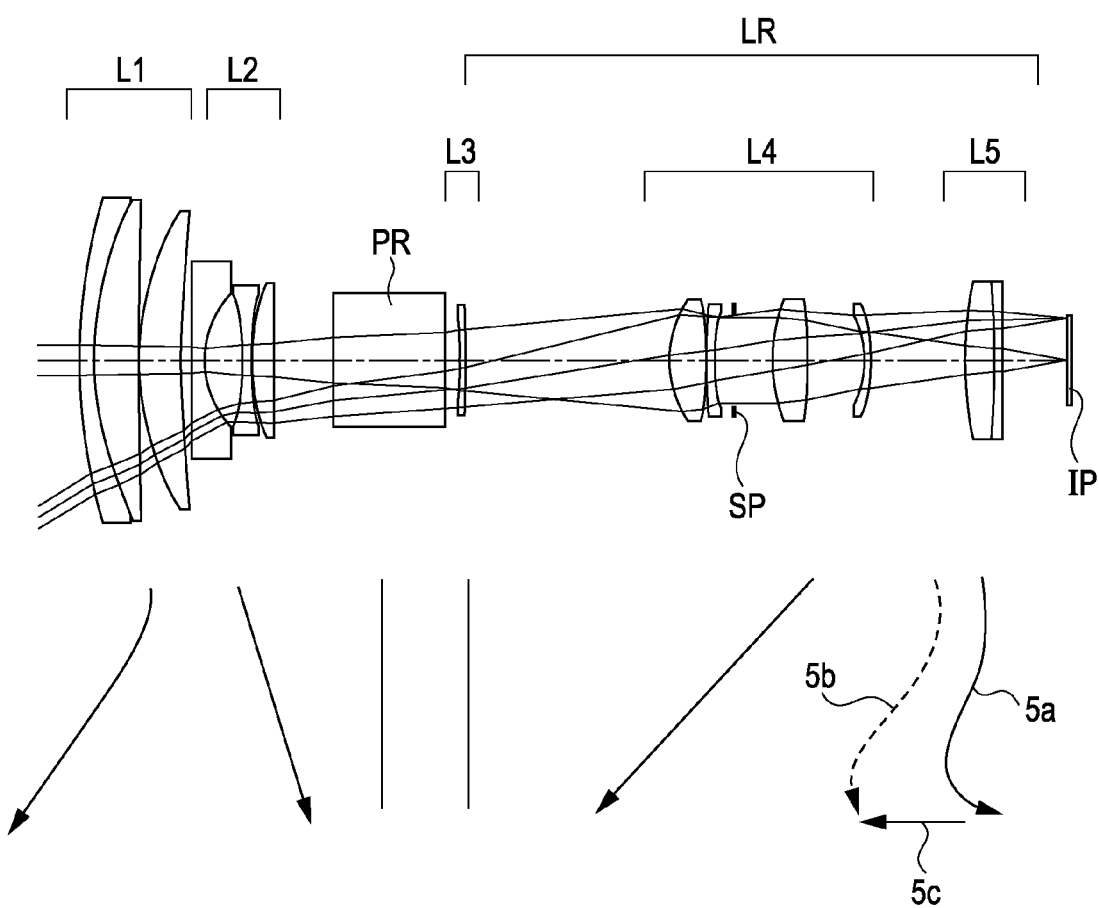

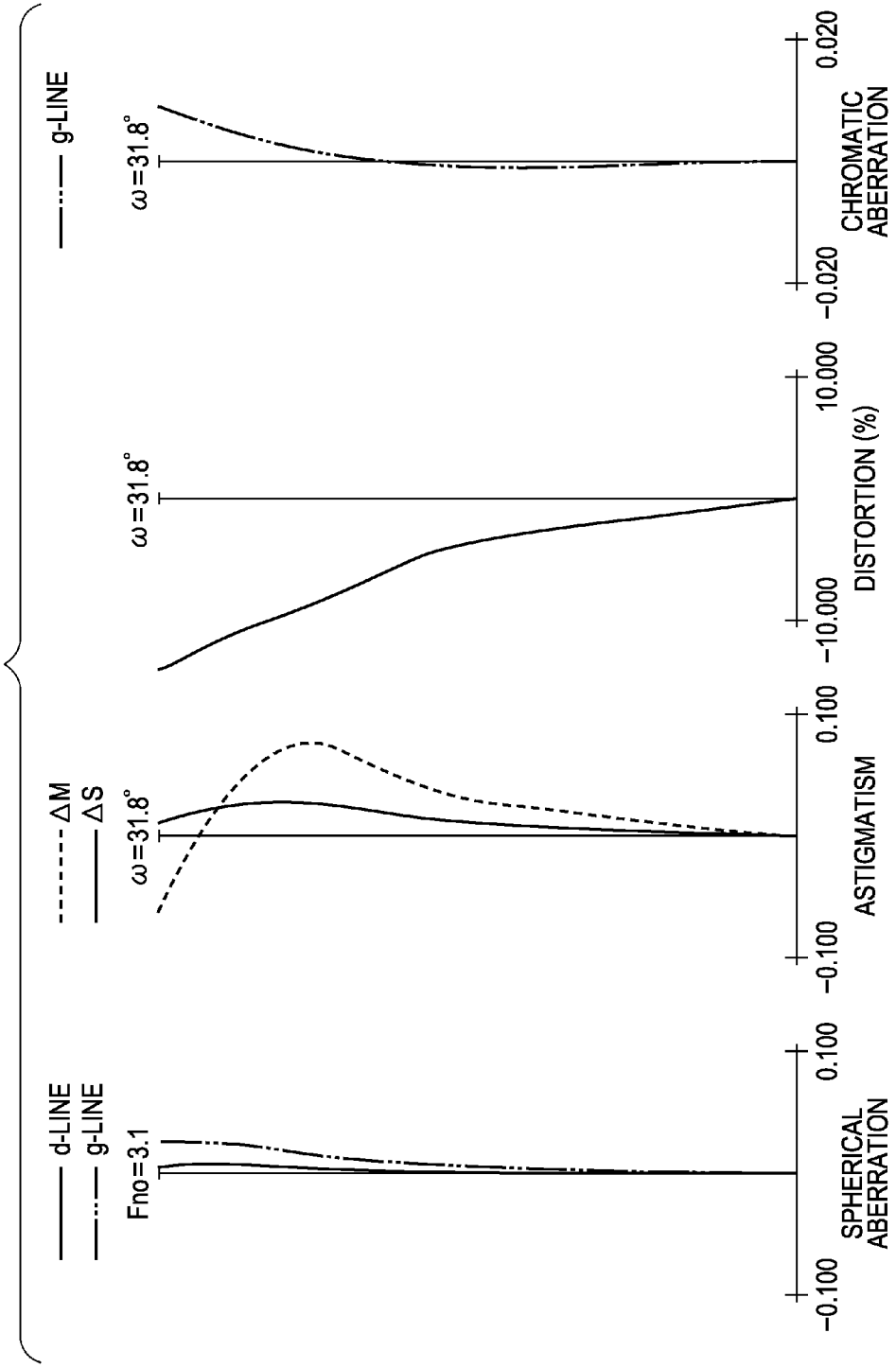

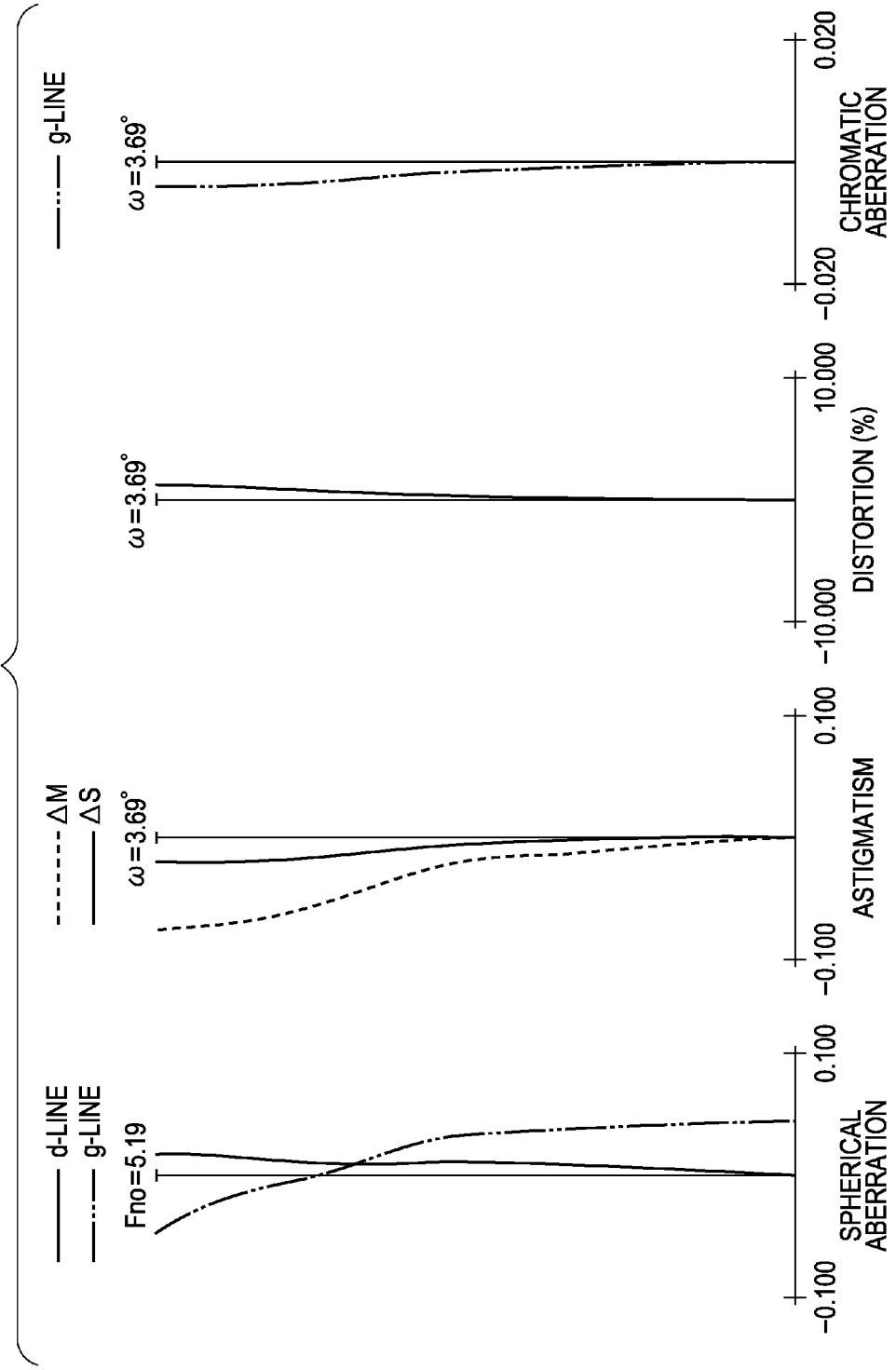

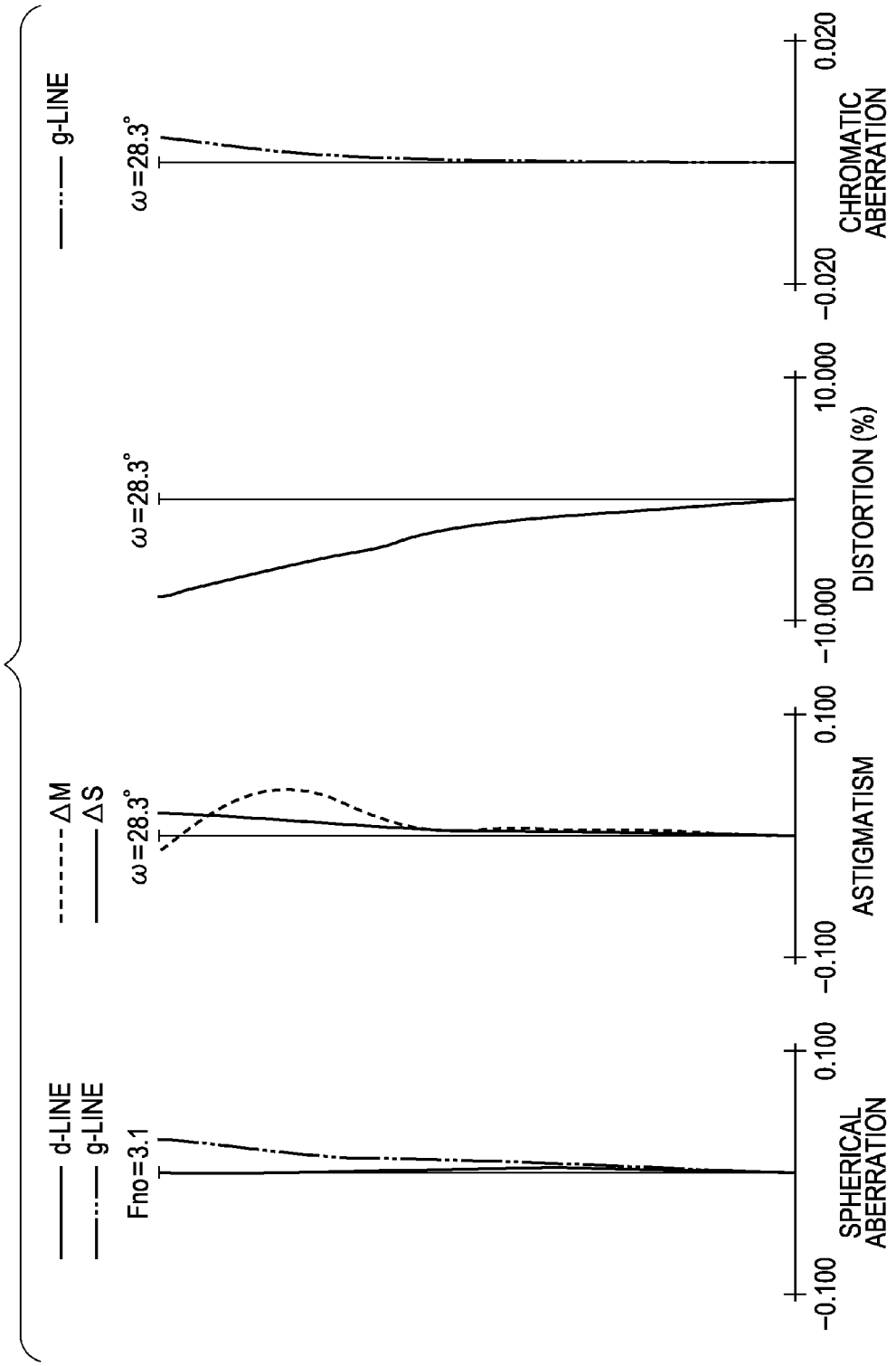

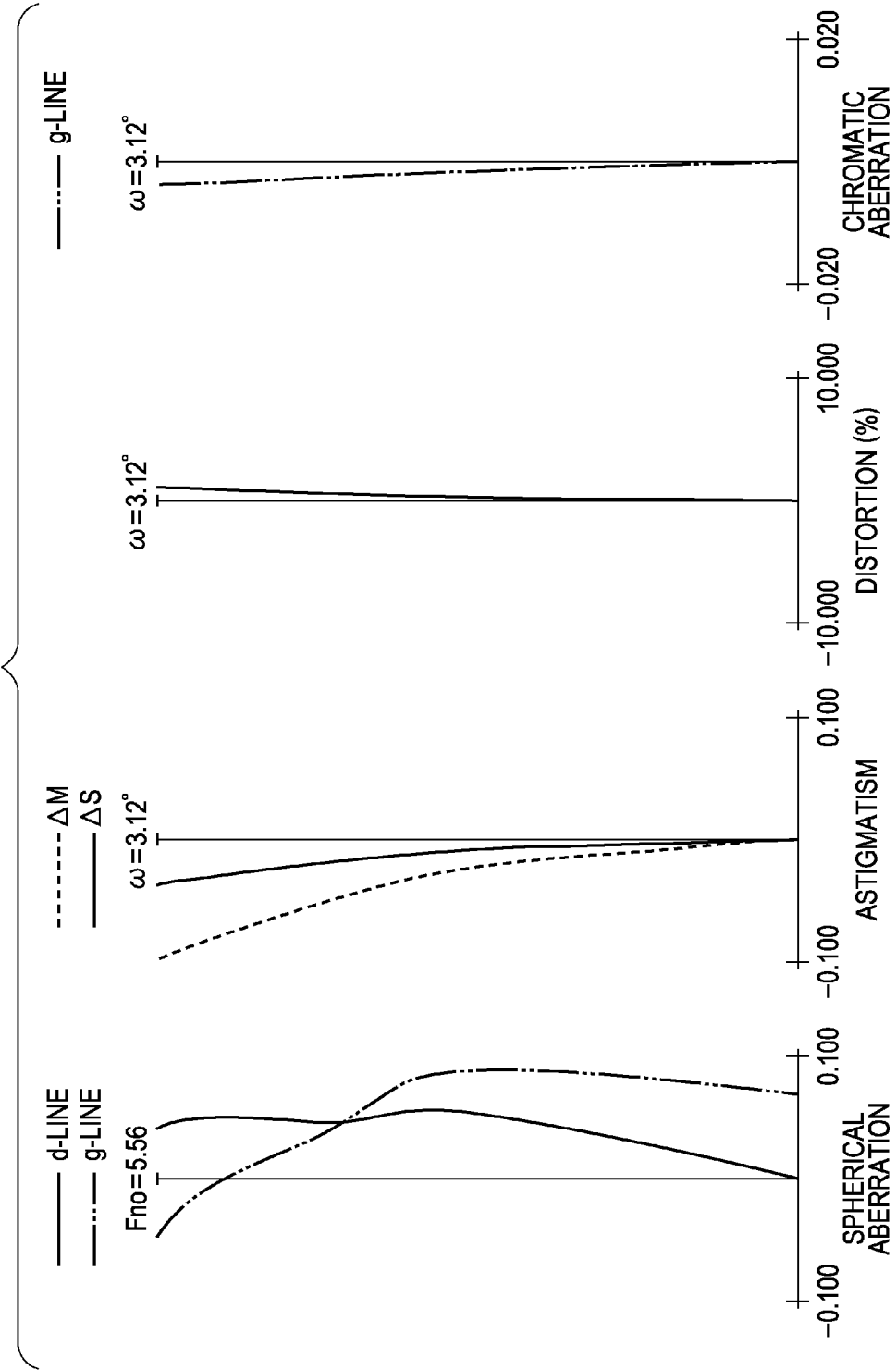

ZOOM LENS AND IMAGE PICKUP APPARATUS INCLUDING THE SAME

BACKGROUND OF THE INVENTION

1. Field of the Invention

The present invention relates to a zoom lens suitable for use as an imaging optical system in an image pickup apparatus such as a video camera, a digital still camera, a broadcast camera, or a silver-halide camera.

2. Description of the Related Art

In recent years, an imaging optical system used in an image pickup apparatus has been requested to have a high zoom ratio and a compact size, and is particularly required to be formed by a zoom lens that allows thinning of a camera. A so-called retractable type zoom lens is known in which lens units are stored in a camera housing in a non-image-taking state by reducing gaps between the lens units to gaps different from those in an image taking state in order to achieve a smaller size of the camera and a higher zoom ratio of the zoom lens. Also, a so-called bent type zoom lens is known in which a reflecting prism for bending the optical axis of an imaging optical system 90 degrees is provided in the optical path so as to reduce the thickness of the camera. Examples of bent-type lenses are disclosed in U.S. Pat. No. 6,333,823 and U.S. Patent Application Publication No. 2007/0014031 A1. Moreover, as a combination of the above-described types of zoom lenses, U.S. Patent Application Publication No. 2007/0091200 A1 discloses a so-called bent and retractable type zoom lens in which a reflecting prism moves in a non-image-taking state so that lens units on an object side of the reflecting prism are stored in a space formed by the movement of the reflecting prism.

When a retractable type zoom lens includes a reflecting prism for bending the optical path of an imaging optical system, a high zoom ratio can be easily obtained, and a camera to which the zoom lens is applied can be thinned easily. However, to obtain these advantages, it is important to properly set the lens configuration of the zoom lens, the structure of the reflecting prism, and the layout in the optical path. For example, it is important to properly set the number of lens units, the layout of refractive powers of the lens units, moving conditions of the lens units for zooming, the material and length in the optical axis direction of the reflecting prism, and the position of the reflecting prism in the optical path. Unless these structures are properly set, it is difficult to obtain the above-described advantages. In the zoom lens disclosed in U.S. Patent Application Publication No. 2007/0091200 A1, since the reflecting prism is provided in the second lens unit, the second lens is incapable of moving for zooming. For this reason, the moving amount of the first lens unit for zooming increases, and it is therefore difficult to reduce the thickness of the camera. Further, since the moving amount of the first lens unit is large, it is difficult to reduce the thickness of the camera by moving the reflecting prism and putting the lens units, which are located on the object side of the reflecting prism, into the camera body for storage.

SUMMARY OF THE INVENTION

A zoom lens according to an aspect of the present invention includes a first lens unit having a positive refractive power; a second lens unit having a negative refractive power; a reflecting prism for bending an optical path; and a rear lens group including a plurality of lens units. The first lens unit, the second lens unit, the reflecting prism, and the rear lens group are arranged in order from an object side to an image side. At least the first and second lens units move during zooming. During retraction into a storage state, the reflecting prism moves to a position different from a position in an image taking state, and at least a part of the first lens unit and the second lens unit is retracted and stored in a space formed by the movement of the reflecting prism. The following conditions are satisfied:

$$0.25 < |m1|/(DL1+DL2) < 0.76$$

$$0.25 < f1/ft < 0.55$$

where DL1 and DL2 represent thicknesses of the first lens unit and the second lens unit on an optical axis, respectively, m1 represents a moving amount of the first lens unit during zooming from a wide angle end to a telephoto end, f1 represents a focal length of the first lens unit, and ft represents a focal length of the entire zoom lens at the telephoto end.

According to the present invention, it is possible to obtain a zoom lens that allows a good image to be easily obtained at a high zoom ratio and that reduces the thickness of, for example, a camera to which the zoom lens is applied.

Further features of the present invention will become apparent to those of ordinary skill in the art from the following description of exemplary embodiments with reference to the attached drawings.

BRIEF DESCRIPTION OF THE DRAWINGS

FIG. 1 is a cross-sectional view of a zoom lens according to a first embodiment of the present invention in which an optical path is open.

FIGS. 2A and 2B are aberration diagrams of the first embodiment, respectively, at a wide angle end and at a telephoto end.

FIGS. 4A and 4B are aberration diagrams of the second embodiment, respectively, at a wide angle end and at a telephoto end.

FIGS. 6A and 6B are aberration diagrams of the third embodiment, respectively, at a wide angle end and at a telephoto end.

FIG. 7 is a cross-sectional view of a zoom lens according to a fourth embodiment of the present invention in which an optical path is open.

FIGS. 8A and 8B are aberration diagrams of the fourth embodiment, respectively, at a wide angle end and at a telephoto end.

FIGS. 10A and 10B are aberration diagrams of the fifth embodiment, respectively, at a wide angle end and at a telephoto end.

DESCRIPTION OF THE EMBODIMENTS

Preferred embodiments of the present invention will be described below with reference to the attached drawings. A zoom lens according to the present invention includes, in order from an object side to an image side, a first lens unit having a positive refractive power, a second lens unit having a negative refractive power, and a reflecting prism for bending the optical axis of an optical system 90 degrees (or within a range of 90±10 degrees). The zoom lens also includes, on an image side of the reflecting prism, a rear lens group including a plurality of lens units. During zooming from a wide angle end to a telephoto end, at least the first lens unit and the second lens unit move. When the zoom lens is brought into a retracted state, the reflecting prism moves from a position in an image taking state to a different position. Then, at least a part of the first lens unit and the second lens unit is stored in a space formed by the movement of the reflecting prism. The side of a lens where an object to be imaged is placed is referred to as the object side or front side of the lens; and the side of the lens where the image is formed is referred to as the image side or back side of the lens.

Figure 3:
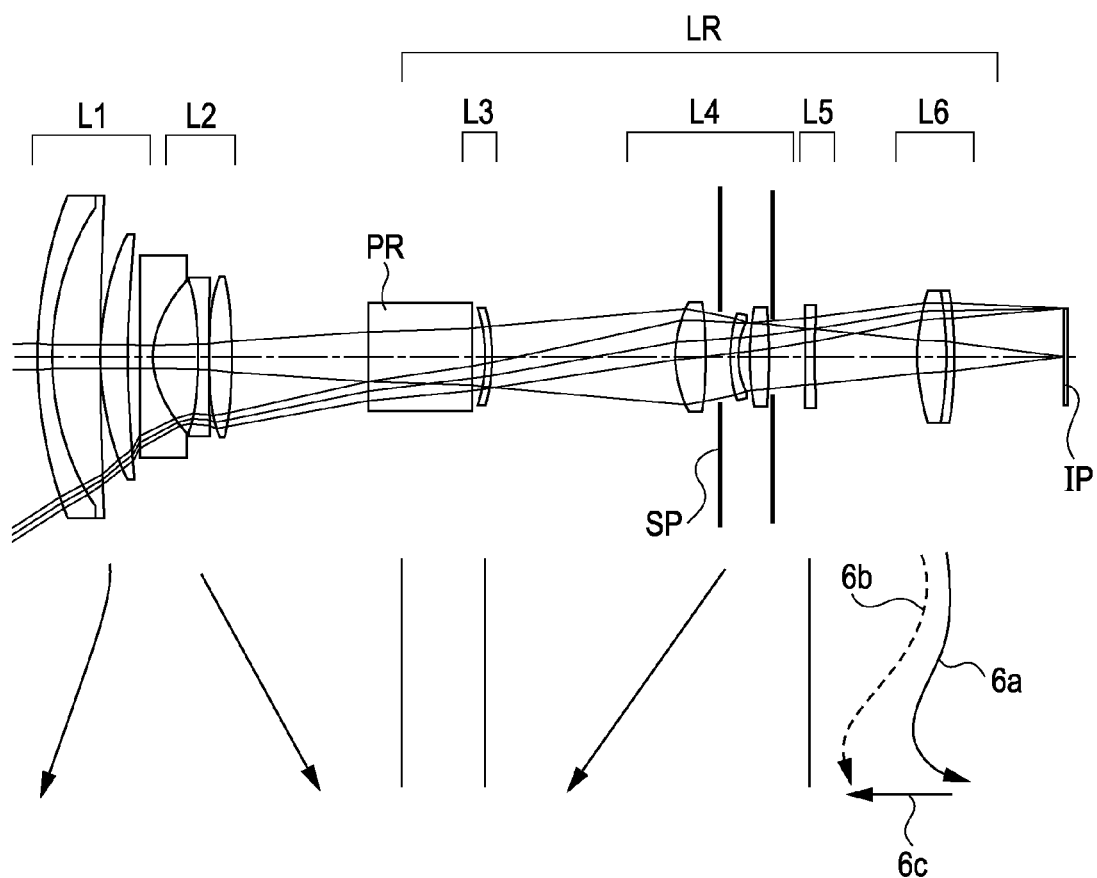
FIG. 3 is a cross-sectional view of a zoom lens according to a second embodiment of the present invention in which an optical path is open.
Figure 5:
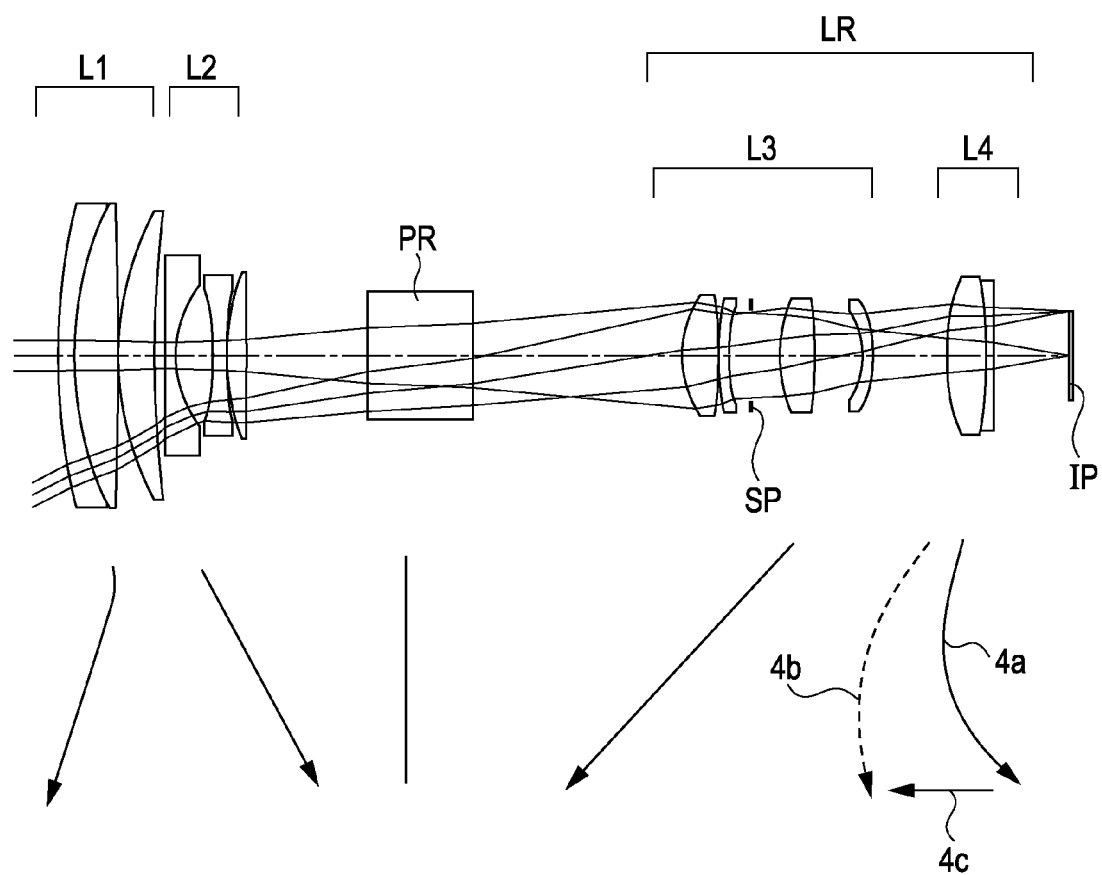
FIG. 5 is a cross-sectional view of a zoom lens according to a third embodiment of the present invention in which an optical path is open.
Figure 9:
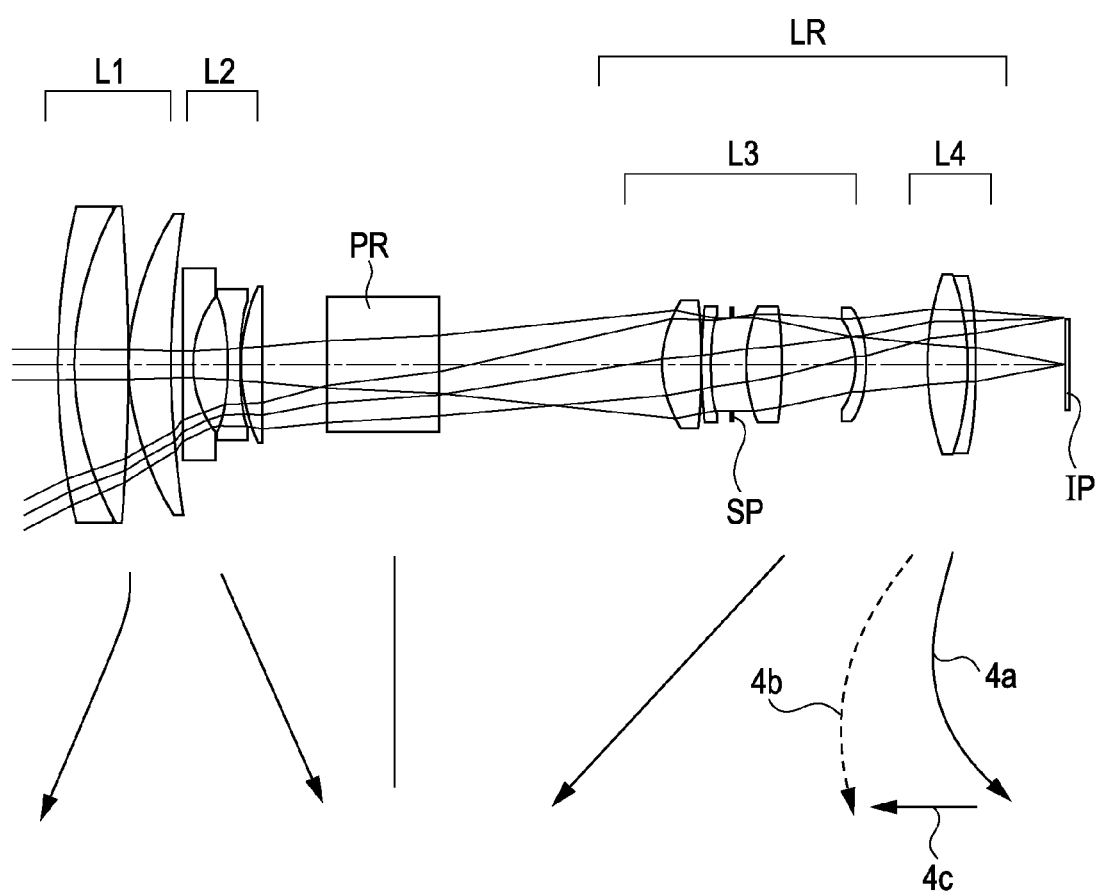
FIG. 9 is a cross-sectional view of a zoom lens according to a fifth embodiment of the present invention in which an optical path is open.
Figure 11A:
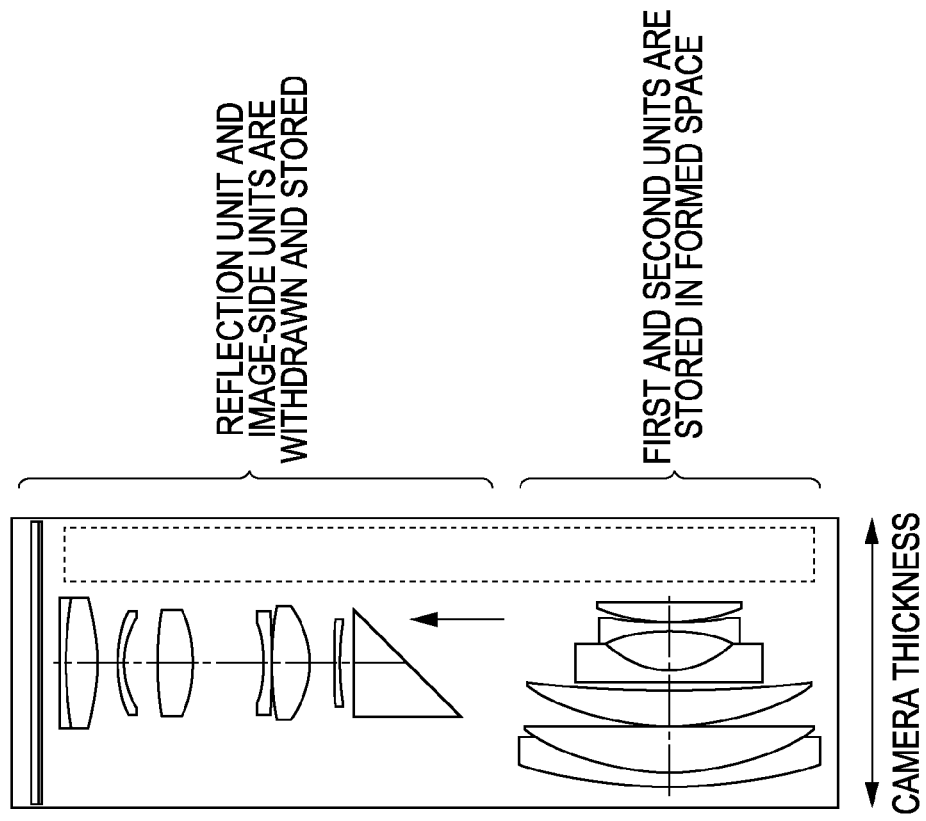
FIGS. 11A and 11B are cross-sectional views of the zoom lens of the first embodiment.
Figure 11B:
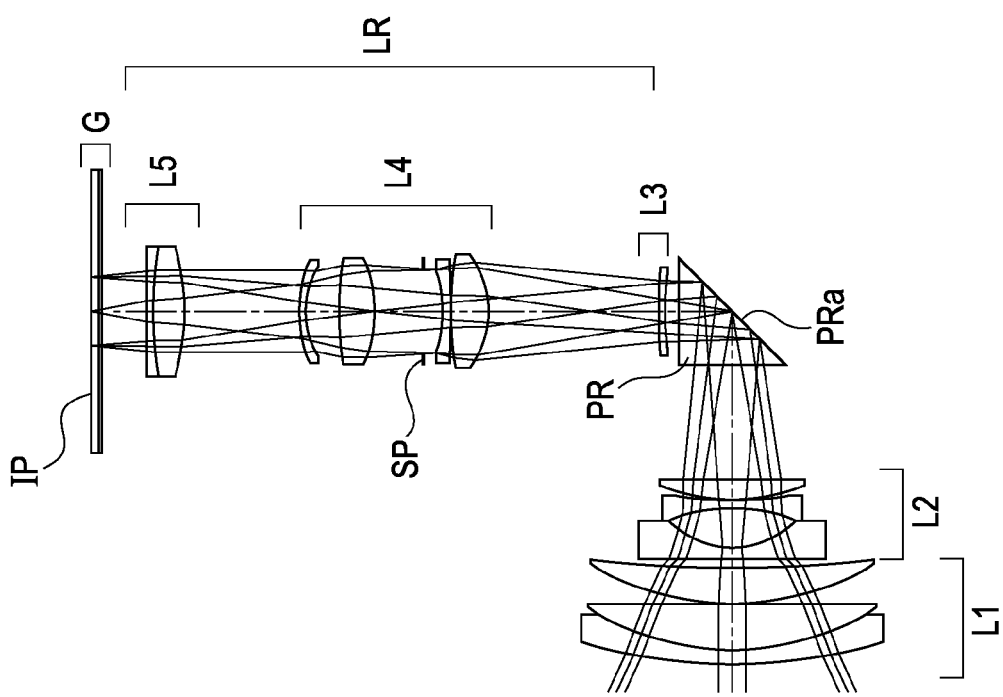
Figure 12:
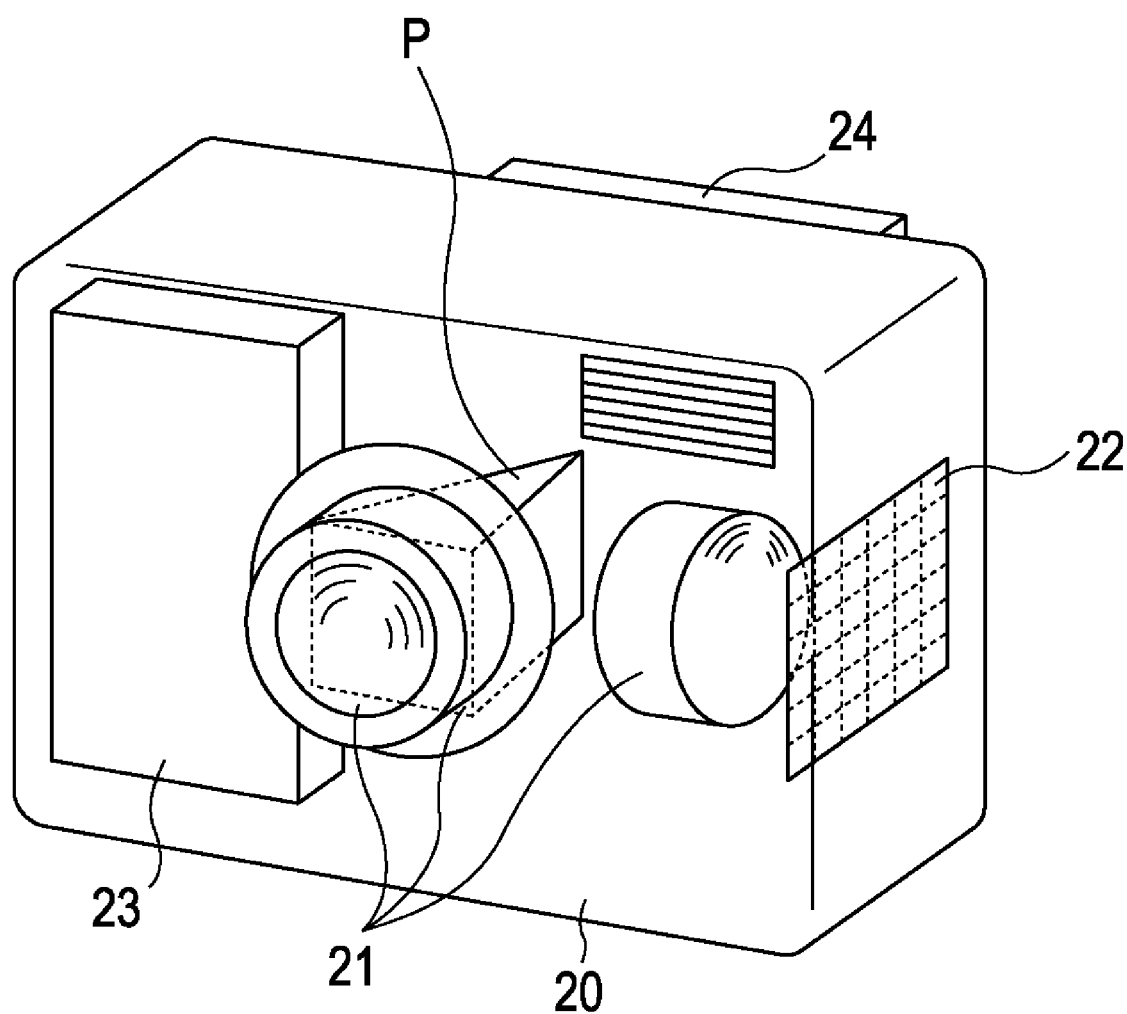
FIG. 12 is a schematic view illustrating an image pickup apparatus according to the present invention.

FIG. 1 is a lens cross-sectional view of a zoom lens at a wide angle end (short focal-length end) according to a first embodiment of the present invention in which an optical path is open. FIGS. 2A and 2B are aberration diagrams of the zoom lens of the first embodiment, respectively, at the wide angle end and at a telephoto end (long focal-length end). FIG. 3 is a lens cross-sectional view of a zoom lens at a wide angle end according to a second embodiment of the present invention in which an optical path is open. FIGS. 4A and 4B are aberration diagrams of the zoom lens of the second embodiment, respectively, at the wide angle end and at a telephoto end. FIG. 5 is a lens cross-sectional view of a zoom lens at a wide angle end according to a third embodiment of the present invention in which an optical path is open. FIGS. 6A and 6B are aberration diagrams of the zoom lens of the third embodiment, respectively, at the wide angle end and at a telephoto end. FIG. 7 is a lens cross-sectional view of a zoom lens at a wide angle end according to a fourth embodiment of the present invention in which an optical path is open. FIGS. 8A and 8B are aberration diagrams of the zoom lens of the fourth embodiment, respectively, at the wide angle end and at a telephoto end. FIG. 9 is a lens cross-sectional view of a zoom lens at a wide angle end according to a fifth embodiment of the present invention in which an optical path is open. FIGS. 10A and 10B are aberration diagrams of the zoom lens of the fifth embodiment, respectively, at the wide angle end and at a telephoto end. FIGS. 11A and 11B respectively illustrate an image taking state in which the optical axis of the zoom lens of the first embodiment is bent, and a storage state (retracted state) in which the zoom lens is stored in a camera body. FIG. 12 is a schematic view illustrating parts of a digital camera (image pickup apparatus) including a zoom lens in accordance with one embodiment of the present invention.

The zoom lens of each of the embodiments is an imaging optical system suitable for use in an image pickup apparatus, but the embodiments are not limited thereto. As long as the structure and ordering of the lens units are maintained, the zoom lens of the embodiments disclosed herein can be suitable for use in apparatuses other than an image pickup apparatus. To that end, in the lens cross-sectional views in which the optical path is open, the left side of the drawings is an object side (front side), and the right side is an image side (rear side). Thus, for example, when the zoom lens of the embodiment is used as a projection lens in a projector, the left side of the drawing would correspond to a screen side and the right side is a projected image side in the lens cross-sectional view in which the optical path is open. In the lens cross-sectional views, i represents the order number of the lens unit from the object side, Li represents the i-th lens unit, LR represents a rear lens group including a plurality of lens units, SP represents a stop, and PR represents a reflecting prism having a reflecting surface for bending the optical axis of the optical system by 90 degrees. In the cross-sectional views of the several embodiments, arrows indicate moving paths of the lens units during zooming from the wide angle end to the telephoto end, or moving directions of the lens unit during focusing. In the aberration diagrams, Fno represents the f-number, d and g respectively represent the d-line and the g-line, and ΔM and ΔS respectively represent a meridional image plane and a sagittal image plane for the d-line. Lateral chromatic aberration is expressed by the g-line.

In FIG. 11A, L1 represents a first lens unit having a positive refractive power (optical power=reciprocal of focal length), L2 represents a second lens unit having a negative refractive power, and LR represents a rear lens group including a plurality of lens units. In FIG. 11A, the rear lens group LR includes a third lens unit L3 having a negative refractive power, a fourth lens unit L4 having a positive refractive power, and a fifth lens unit L5 having a positive refractive power. A reflecting prism PR has a reflecting surface PRa, and is provided between the second lens unit L2 and the third lens unit L3 so as to reflect a light beam on the optical axis 90 degrees from the incident direction. An aperture stop SP is provided in the fourth lens unit L4. An optical block GB corresponds to, for example, an optical filter or a face plate. An image plane IP corresponds to an image pickup surface of a solid-state image pickup element (photoelectric conversion element), such as a CCD sensor or a CMOS sensor, when the zoom lens is used as an imaging optical system in a video camera or a digital still camera, and corresponds to a film surface when the zoom lens is used an image pickup optical system in a silver-halide film camera.

In the zoom lenses of the embodiments, the reflecting prism PR for bending light from the object side is provided in the imaging optical system, so that the thickness of the camera is reduced easily. By forming the reflecting prism PR of a medium having a high refractive index, the air-equivalent length between the second and third lens units particularly in the wide angle range can be shortened, and therefore, the front lens diameter and the camera thickness can be reduced. In the embodiments, the refractive power of the first lens unit L1 is large so as to reduce the moving amount of the first lens unit L1 during zooming and to thereby reduce the camera thickness. Further, during transition of the zoom lens from an image taking state (FIG. 11A) to a storage state (FIG. 11B), the third, fourth, and fifth lens units L3, L4, and L5 move in a direction perpendicular to the optical axis of the first and second lens units L1 and L2. Also, the reflecting prism PR moves in the direction perpendicular to the optical axis of the first and second lens units L1 and L2, and at least part of the first lens unit L1 and the second lens unit L2 is stored in a retracted state in a space formed by the movement of the reflecting prism PR. By adopting such a retractable and bending zoom lens, the camera is thinned further.

Further, the first lens unit L1 is moved by an appropriate moving amount with respect to the total thickness of the first and second lens units L1 and L2 during zooming so as to achieve a smaller thickness of the camera and a higher zoom ratio. In the zoom lens of each of the embodiments, the following conditional expressions are satisfied:

$$0.25 < |m1|/(DL1+DL2) < 0.76 \quad (1)$$

$$0.25 < fl/ft < 0.55 \quad (2)$$

where DL1 and DL2 represent thicknesses on the optical axis of the first and second lens units L1 and L2, respectively, m1 represents a moving amount of the first lens unit L1 during zooming from the wide angle end to the telephoto end, f1 represents a focal length of the first lens unit L1, and ft represents a focal length of the entire system at the telephoto end. Here, the wide angle end and the telephoto end refer to zoom positions where the lens unit for zooming is alternatively placed at each of the two ends of a mechanical movable range on the optical axis. The moving amount is a difference between a position of the moving lens unit relative to the image plane at the wide angle end and a position where the moving lens unit is placed relative to the image plane at the telephoto end. The sign of the moving amount is positive when the moving lens unit is displaced towards the image side during zooming from the wide angle end to the telephoto end.

To retract the lens units on the object side of the reflecting prism PR while withdrawing the reflecting prism PR, a cam cylinder (not shown) for moving the lens units on the object side of the reflecting prism PR needs to have a large cutout for withdrawal of the reflecting prism PR. In this case, a sufficient rotation angle of the cam cylinder is not ensured because of the cutout. As a result, in the moving range of the first lens unit L1, not only the movement amount from the image taking state to the storage state, but also the moving amount for zooming are limited, and it is therefore difficult to increase the zoom ratio. Accordingly, in the embodiments disclosed herein, the first lens unit L1 is moved for zooming by an appropriate moving amount m1 relative to the total thickness of the first and second lens units L1 and L2 so as to satisfy Conditional Expression (1). In this case, the refractive power of the first lens unit L1 is increased for a higher zoom ratio so as to satisfy Conditional Expression (2). This allows the camera to be easily thinned by the retractable mechanism. Further, in the embodiments, the lens unit having a positive refractive power is provided closest to the object side. Also, at least the first and second lens units L1 and L2 are movable for zooming so as to achieve a high zoom ratio. Moreover, the reflecting prism PR is arranged on the image side of the second lens unit L2, and is moved in a retracted state to a position different from a position in the image taking state. Then, at least part of the first and second lens units L1 and L2 is stored in a space formed by the movement of the reflecting prism PR, so that a thin zoom lens having a high zoom ratio is realized.

Conditional Expression (1) specifies the ratio of the moving amount of the first lens unit L1 for zooming to the total thickness of the first and second lens units L1 and L2. When the value falls below the lower limit in Conditional Expression (1), the moving amount of the first lens unit L1 is too small, and it is therefore difficult to reduce the front-lens effective diameter and the thickness of the camera. In contrast, when the value exceeds the upper limit, the moving amount of the first lens unit L1 is too large, and the thickness of the camera is determined by the moving amount for zooming, which increases the size of the camera. For the above reason, it may be more preferable that the thickness of the camera can be easily reduced further by setting the numerical range in Conditional Expression (1) to a range in Conditional Expression (1a):

$$0.27 < |m1|/(DL1+DL2) < 0.76 \quad (1a)$$

Conditional Expression (2) specifies the refractive power of the first lens unit L1. When the value falls below the lower limit, the refractive power of the first lens unit L1 is too large, and the thickness of a positive lens formed by the first lens unit L1 is large. In contrast, when the value exceeds the upper limit, the refractive power of the first lens unit L1 is too small, the moving amount for obtaining a desired zoom ratio is large, and it is therefore difficult to reduce the thickness of the camera. More preferably, the thickness of the camera can be easily reduced further by setting the numerical range in Conditional Expression (2) to a range in Conditional Expression (2a):

$$0.30 < f1/ft < 0.53 \quad (2a)$$

By setting the refractive power of the first lens unit L1 as in Conditional Expression (2) while properly setting the moving amount of the first lens unit L1 for zooming as in Conditional Expression (1), the thickness of the camera is reduced and the zoom ratio is increased easily. In the embodiments, it is more preferable to satisfy at least one of the following conditional expressions. In this case, the advantages corresponding to the conditional expressions can be obtained.

The reflecting prism PR is formed of a medium having a high refractive index, and the first lens unit L1 includes a negative lens. At least one of the following Conditional Expressions (3) to (7) is satisfied:

$$0.050 < Lpr/(Npr \cdot ft) < 0.100 \quad (3)$$

$$0.00 < (R1+R2)/(R1-R2) < 6.00 \quad (4)$$

$$0.10 < (m2-m1)/ft < 0.28 \quad (5)$$

$$0.05 < |f2|/ft < 0.29 \quad (6)$$

$$0.15 < Zr/Z < 0.30 \quad (7)$$

where Lpr and Npr respectively represent a thickness in the optical axis direction and a refractive index of the medium of the reflecting prism PR, R1 and R2 represent radii of curvature of an object-side lens surface and an image-side lens surface of the negative lens, respectively, m2 represents a moving amount of the second lens unit L2 for zooming from the wide angle end to the telephoto end, |f2| represents the absolute value of a focal length of the second lens unit L2, and Zr and Z represent zoom ratios of the rear lens group LR and the entire zoom lens, respectively.

Conditional Expression (3) specifies the ratio of the focal length of the entire zoom lens at the telephoto end to the thickness (air-equivalent length) of the reflecting prism PR in the optical axis direction. The air-equivalent length is expressed by Lpr/Npr. When the value falls below the lower limit, the space where the reflecting prism PR is placed is insufficient. When the value exceeds the upper limit, for example, when the refractive index Npr of the material (medium) is one like air, a larger space is necessary for placing the reflecting prism PR, and it is therefore difficult to reduce the thickness of the camera. More preferably, the thickness of the camera can be easily reduced further by setting the numerical range in Conditional Expression (3) to a range in the following Conditional Expression (3a):

$$0.060 < Lpr/(Npr \cdot ft) < 0.090 \quad (3a)$$

Conditional Expression (4) specifies the lens shape of the negative lens in the first lens unit L1. When the value falls below the lower limit, the radius of curvature of a concave surface of the negative lens facing the object side is small, and the thickness of the first lens unit L1 is needlessly large. Moreover, aberration correction is difficult. In contrast, when the value exceeds the upper limit, it is difficult to correct aberration when increasing the zoom ratio. More preferably, the thickness of the camera can be easily reduced further by setting the numerical range in Conditional Expression (4) to a range in the following Conditional Expression (4a):

$$1.00 < (R1+R2)/(R1-R2) < 6.00 \quad (4a)$$

Conditional Expression (5) specifies the ratio of the total moving amount of the first and second lens units L1 and L2 for zooming and the focal length of the entire zoom lens at the telephoto end. When the value falls below the lower limit, it is difficult to achieve a high zoom ratio. In contrast, when the value exceeds the upper limit, the moving amount for zooming is large, and it is therefore difficult to reduce the thickness of the camera. More preferably, a higher zoom ratio and a thinner camera can be achieved easily by setting the numerical range in Conditional Expression (5) to a range in the following Conditional Expression (5a):

$$0.13 < (m2-m1)/ft < 0.27 \quad (5a)$$

Conditional Expression (6) specifies the ratio of the focal length of the second lens unit L2 and the focal length of the entire zoom lens at the telephoto end. When the value falls below the lower limit, the refractive power of the second lens unit L2 is too large, and it is difficult to reduce the thickness of the camera, for example, the thickness of a peripheral portion of the negative lens increases. In contrast, when the value exceeds the upper limit, it is difficult to achieve a high zoom ratio, or the moving amount of the second lens unit L2 for zooming increases.

Conditional Expression (7) specifies the zoom-function sharing ratio of the rear lens group LR. When the value falls below the lower limit, the zoom-function sharing ratio of the first and second lens units L1 and L2 increases, the moving amount thereof for zooming increases, and therefore, the thickness of the camera increases. In contrast, when the value exceeds the upper limit, the moving amount of the rear lens group LR for zooming increases, and the width of the camera increases. More preferably, the thickness and width of the camera can be easily reduced by setting the numerical range in Conditional Expression (7) to a range in the following Conditional Expression (7a):

$$0.20 < Zr/Z < 0.27 \quad (7a)$$

Preferably, a direction in which the reflecting prism PR moves in the retracted state to the position different from the position in the image taking state is perpendicular to the optical axis of the first lens unit L1 and the second lens unit L2, or is perpendicular to the optical axis with a margin of ±10 degrees. Since this structure reduces retracting movement of the lens units in the camera thickness direction, the thickness of the camera can be reduced further. The reflecting prism PR does not move (is fixed) relative to the image plane for zooming, but it may move for other purposes. With this structure, a space where a driving unit or the like is arranged is unnecessary, and the thickness of the camera can be reduced further. Next, characteristics of lens configurations of the embodiments will be described.

First Embodiment

A description will be given of a lens configuration of a zoom lens of the first embodiment shown in FIG. 1. The zoom lens of the first embodiment includes, in order from the object side to the image side, a first lens unit L1 having a positive refractive power, a second lens unit L2 having a negative refractive power, a reflecting prism PR, and a rear group LR that are arranged along an optical axis of the zoom lens. The rear group LR includes a third lens unit L3 having a negative refractive power, a fourth lens unit L4 having a positive refractive power, and a fifth lens unit L5 having a positive refractive power. In the reflecting prism PR, a reflecting surface is provided to bend the optical path of light from the object. For zooming, the reflecting prism PR and the third lens unit L3 are fixed (do not move). While the third lens unit L3 is fixed during zooming in the first embodiment, it may be moved towards the object side during zooming from the wide angle end to the telephoto end, as necessary. In this case, spherical aberration and coma aberration can be easily corrected at the intermediate zoom position. To achieve a high zoom ratio while ensuring a space where the reflecting prism PR is placed, the power of the first lens unit L1 is set to be large. During zooming from the wide angle end to the telephoto end, the first and fourth lens units L1 and L4 move to the object side. While the second lens unit L2 moves to the image side, it may move to the image side along a convex path in this case. Further, the positive refractive power of the fourth lens unit L4 is increased by placing the third lens unit L3 having a negative refractive power, and the fourth lens unit L4 is greatly moved to the object side, thereby achieving a high zoom ratio. To correct image plane variation due to zooming, the fifth lens unit L5 moves to the object side along a convex path. Focusing is performed by the fifth lens unit L5 when the image taking distance changes. A solid curve 5a and a dashed curve 5b relating to the fifth lens unit L5 indicate moving paths along which the fifth lens unit L5 moves to correct image plane variation due to zooming from the wide angle end to the telephoto end, respectively, when the focus is on an object at infinity and a near object. Focusing from the object at infinity to the near object at the telephoto end is performed by moving the fifth lens unit L5 forward (to the object side), as shown by arrow 5c. So-called motion blur correction for correcting motion blur due to vibration of the camera is performed by displacing a part of the fourth lens unit L4 (the third positive lens in the fourth lens unit L4 from the object side) in a manner such as to have a component in a direction perpendicular to the optical axis.

Second Embodiment

A description will be given of a lens configuration of a zoom lens of the second embodiment shown in FIG. 3. The zoom lens of the second embodiment includes, in order from the object side to the image side, a first lens unit L1 having a positive refractive power, a second lens unit L2 having a negative refractive power, a reflecting prism PR, and a rear group LR. The rear group LR includes a third lens unit L3 having a negative refractive power, a fourth lens unit L4 having a positive refractive power, a fifth lens unit L5 having a negative refractive power, and a sixth lens unit L6 having a positive refractive power. In the reflecting prism PR, a reflecting surface is provided to bend the optical path from the object. For zooming, the reflecting prism PR, the third lens unit L3, and the fifth lens unit L5 are fixed. During zooming from the wide angle end to the telephoto end, the first lens unit L1 moves to the object side, the second lens unit L2 moves to the image side, and the fourth lens unit L4 moves to the object side. The sixth lens unit L6 moves to the object side along a convex path in order to correct image plane variation due to zooming. The first and second lens units L1 and L2 and the fourth and sixth lens units L4 and L6 are movable for zooming so as to achieve a high zoom ratio. When the image taking distance changes, focusing is performed by the sixth lens unit L6. A solid curve 6a and a dashed curve 6b relating to the sixth lens unit L6 indicate moving paths along which the six lens unit L6 moves to correct image plane variation due to zooming from the wide angle end to the telephoto end, respectively, when the focus is on an object at infinity and a near object. Focusing from the object at infinity to the near object at the telephoto end is performed by moving the sixth lens unit L6 forward (to the object side), as shown by arrow 6c. Motion blur correction is performed by displacing a part of the fourth lens unit L4 (the third positive lens in the fourth lens unit L4 from the object side) in a manner such as to have a component in a direction perpendicular to the optical axis. Since other structures are the same as those adopted in the first embodiment, detailed descriptions thereof are omitted.

Third Embodiment

A description will be given of a lens configuration of a zoom lens of a third embodiment shown in FIG. 5. The zoom lens of the third embodiment includes, in order from the object side to the image side, a first lens unit L1 having a positive refractive power, a second lens unit L2 having a negative refractive power, a reflecting prism PR, and a rear group LR. The rear group LR includes a third lens unit L3 having a positive refractive power and a fourth lens unit L4 having a positive refractive power. In the reflecting prism PR, a reflecting surface is provided to bend the optical path from the object. During zooming from the wide angle end to the telephoto end, the first lens unit L1 and the third lens unit L3 move to the object side, and the second lens unit L2 moves to the image side. To correct image plane variation due to zooming, the fourth lens unit L4 moves to the object side along a convex path. The reflecting prism PR is fixed for zooming. When the image taking distance changes, focusing is performed by the fourth lens unit L4. A solid curve 4a and a dashed curve 4b relating to the fourth lens unit L4 indicate moving paths along which the fourth lens unit L4 moves to correct image plane variation due to zooming from the wide angle end to the telephoto end, respectively, when the focus is on an object at infinity and a near object. Focusing from the object at infinity to the near object at the telephoto end is performed by moving the fourth lens unit L4 forward, as shown by arrow 4c. Motion blur correction is performed by displacing a part of the third lens unit L3 (the third positive lens in the third lens unit L3 counted from the object side) in a manner such as to have a component in a direction perpendicular to the optical axis. Since other structures are the same as those adopted in the first embodiment, detailed descriptions thereof are omitted.

Fourth Embodiment

A description will be given of a lens configuration of a zoom lens of the fourth embodiment shown in FIG. 7. The lens configuration of the fourth embodiment is substantially identical to that of the first embodiment shown in FIG. 1. In the fourth embodiment, a first lens unit L1 is moved to the object side by the maximum amount permitted by the thickness of the camera so that the focal length at the wide angle end is closer to that at the wide angle side while avoiding the increase in front-lens effective diameter. Other structures are the same as those adopted in the first embodiment.

Fifth Embodiment

A description will be given of a lens configuration of a zoom lens of the fifth embodiment shown in FIG. 9. The lens configuration of the fifth embodiment is substantially identical to that of the third embodiment shown in FIG. 5. In the fifth embodiment, the moving amount of first and second lens units L1 and L2 for zooming is reduced and the thickness of the camera is reduced by increasing the refractive power of the first lens unit L1. Other structures are the same as those adopted in the third embodiment.

In the above embodiments, control may be performed so as to change the aperture diameter of the aperture stop SP in order to reduce variation in the f-number during zooming. For example, when the zoom lens is combined with an image pickup apparatus including an image pickup element that converts an optical image formed on a light receiving surface into an electrical signal, electrical correction may be added, depending on the amount of distortion.

Next, an example of a digital camera (optical apparatus) using the zoom lens of the present invention as an imaging optical system will be described with reference to FIG. 12. Referring to FIG. 12, the digital camera includes a digital camera body 20, an imaging optical system 21 formed by the zoom lens of any of the above-described embodiments, and a prism P. The imaging optical system 21 forms an image of an object onto a solid-state image pickup element (photoelectric conversion element) 22 such as a CCD. A recording unit 23 records the image of the object received by the image pickup element 22, and a viewfinder 24 is used to observe an image displayed on a display element (not shown). The display element is formed by a liquid crystal panel or the like, and displays the image formed on the image pickup element 22. By thus applying the zoom lens of the present invention to the digital camera or the like, a compact image pickup apparatus having a high optical performance is realized.

Next, numerical examples corresponding to the embodiments of the present invention will now be described. In the numerical examples, i represents the order number of the surface from the object side, ri represents the radius of curvature of the i-th lens surface, di represents the lens thickness and the air gap between the i-th surface and the i+1-th surface, and ndi and vdi respectively represent the refractive index and the Abbe number for the d-line. Further, r12 and r13 represent reflecting prisms PR, and k, A4, A6, A8, and A10 are aspherical coefficients. The aspherical shape is defined by the following expression:

$$x=(h^2/R)/[1+\{1-(1+k)(h/R)^2\}^{1/2}]+A4h^4+A6h^6+A8h^8+A10h^{10}$$

where x represents the displacement in the optical axis direction at a height h from the optical axis with reference to the vertex of the surface, and R represents the radius of curvature. The surface number of an aspherical lens surface is marked with "*". Table 1 shows the relationships between the above-described conditional expressions and the numerical examples.

FIRST NUMERICAL EXAMPLE

Unit: mm
Surface Data

| Surface No. | r | d | nd | vd | Effective diameter |
|---|---|---|---|---|---|
| 1 | 43.277 | 1.25 | 1.84666 | 23.8 | 23.45 |
| 2 | 22.500 | 3.68 | 1.59201 | 67.0 | 22.40 |
| 3 | 331.179 | 0.08 | | | 22.21 |
| 4 | 22.316 | 3.01 | 1.77250 | 49.6 | 21.43 |
| 5 | 87.317 | (variable) | | | 20.88 |
| 6 | 237.841 | 1.00 | 1.84862 | 40.0 | 13.92 |
| 7* | 7.366 | 3.22 | | | 10.52 |
| 8 | −16.992 | 0.75 | 1.77250 | 49.6 | 10.44 |
| 9 | 26.851 | 0.05 | | | 10.55 |
| 10 | 16.206 | 1.59 | 1.94595 | 18.0 | 10.73 |
| 11 | −893.871 | (variable) | | | 10.64 |
| 12 | ∞ | 8.75 | 1.83400 | 37.2 | 7.97 |

-continued

Unit: mm
Surface Data

| Surface No. | r | d | nd | vd | Effective diameter |
|---|---|---|---|---|---|
| 13 | ∞ | (variable) | | | 6.77 |
| 14 | −35.429 | 0.50 | 1.48749 | 70.2 | 6.51 |
| 15 | −61.631 | (variable) | | | 6.45 |
| 16* | 7.870 | 3.04 | 1.58913 | 61.1 | 8.29 |
| 17 | −32.010 | 0.16 | | | 7.81 |
| 18 | −161.853 | 0.55 | 1.80610 | 33.3 | 7.59 |
| 19 | 13.438 | 1.72 | | | 7.25 |
| 20 (stop) | ∞ | 4.11 | | | 7.10 |
| 21* | 11.385 | 2.95 | 1.497002 | 81.6 | 7.84 |
| 22 | −41.230 | 2.73 | | | 7.67 |
| 23 | −7.583 | 0.55 | 1.74320 | 49.3 | 7.30 |
| 24 | −12.362 | (variable) | | | 7.62 |
| 25* | 22.329 | 2.49 | 1.69350 | 53.2 | 9.81 |
| 26 | −45.027 | 0.55 | 1.84666 | 23.9 | 9.62 |
| 27 | −10000.000 | (variable) | | | 9.56 |
| Image plane | ∞ | | | | |

Aspherical Surface Data
Seventh Surface
K=−1.96634e-002  A4=6.95999e-006  A6=−7.39743e-008 A8=1.55845e-008 A10=4.92660e-010
Sixteenth Surface
K=−4.12650e-001 A4=−5.17406e-005 A6=−7.18644e-007 A8=−6.23045e-010
Twenty-First Surface
K=−4.05809e-001 A4=−5.39304e-005 A6=1.49263e-006 A8=−4.14950e-008 A10=1.77160e-009
Twenty-Fifth Surface
K=7.32690e-001  A4=5.83938e-006  A6=−8.36645e-007 A8=3.72222e-008 A10=−5.21415e-010
Various Data
   Zoom ratio 9.42

| | Wide Angle | Intermediate | Telephoto |
|---|---|---|---|
| Focal length | 6.69 | 17.67 | 63.04 |
| F-number | 3.10 | 3.88 | 5.64 |
| Angle of view | 30.08 | 12.37 | 3.52 |
| Image height | 3.88 | 3.88 | 3.88 |
| Total lens length | 83.11 | 84.01 | 88.64 |
| BF | 4.60 | 10.16 | 4.03 |
| d5 | 0.74 | 7.15 | 15.28 |
| d11 | 9.84 | 4.32 | 0.81 |
| d13 | 1.20 | 1.20 | 1.20 |
| d15 | 14.28 | 4.87 | 0.50 |
| d24 | 9.74 | 13.60 | 24.11 |
| d27 | 4.60 | 10.16 | 4.03 |
| Entrance Pupil Position | 18.98 | 39.15 | 119.09 |
| Exit Pupil Position | −36.83 | −55.88 | −304.36 |
| Front principal Point | 24.59 | 52.09 | 169.24 |
| Rear Principal Point | −2.09 | −7.51 | −59.01 |

Zoom Lens Unit Data

| Unit | First Surface | Focal Length | Lens Length | Front Principal Point | Rear Principal Point |
|---|---|---|---|---|---|
| 1 | 1 | 31.07 | 8.02 | 1.64 | −3.15 |
| 2 | 6 | −7.78 | 6.60 | 0.78 | −4.25 |
| PR | 12 | ∞ | 8.75 | 2.39 | −2.39 |
| 3 | 14 | −172.02 | 0.50 | −0.46 | −0.80 |
| 4 | 16 | 17.32 | 15.80 | −0.42 | −12.63 |
| 5 | 25 | 35.85 | 3.04 | −0.17 | −1.93 |

Single Lens Data

| Lens | First Surface | Focal Length |
|---|---|---|
| 1 | 1 | −56.92 |
| 2 | 2 | 40.60 |
| 3 | 4 | 38.04 |
| 4 | 6 | −8.98 |
| 5 | 8 | −13.37 |
| 6 | 10 | 16.84 |
| 7 | 12 | 0.00 |
| 8 | 14 | −172.02 |
| 9 | 16 | 11.03 |
| 10 | 18 | −15.37 |
| 11 | 21 | 18.29 |
| 12 | 23 | −27.76 |
| 13 | 25 | 21.85 |
| 14 | 26 | −53.42 |

SECOND NUMERICAL EXAMPLE

Unit: mm
Surface Data

| Surface No. | r | d | nd | vd | Effective diameter |
|---|---|---|---|---|---|
| 1 | 30.882 | 1.20 | 1.84666 | 23.9 | 23.20 |
| 2 | 20.372 | 3.90 | 1.49700 | 81.5 | 21.20 |
| 3 | 189.124 | 0.10 | | | 9.90 |
| 4 | 22.341 | 2.20 | 1.69680 | 55.5 | 17.30 |
| 5 | 96.515 | (variable) | | | 16.50 |
| 6* | 645.267 | 1.05 | 1.84954 | 40.1 | 14.30 |
| 7* | 7.173 | 3.85 | | | 10.80 |
| 8 | −13.133 | 0.60 | 1.80400 | 46.6 | 10.70 |
| 9 | 413.861 | 0.10 | | | 11.00 |
| 10 | 29.085 | 1.80 | 1.94595 | 18.0 | 11.20 |
| 11 | −41.398 | (variable) | | | 11.20 |
| 12 | ∞ | 8.50 | 1.83400 | 37.2 | 7.67 |
| 13 | ∞ | (variable) | | | 6.66 |
| 14 | −11.521 | 0.60 | 1.48749 | 70.2 | 6.80 |
| 15 | −14.850 | (variable) | | | 7.00 |
| 16* | 9.215 | 2.50 | 1.58313 | 59.4 | 7.90 |
| 17* | −29.635 | 1.00 | | | 7.70 |
| 18 (stop) | ∞ | 1.00 | | | 6.72 |
| 19 | 16.958 | 0.60 | 1.84666 | 23.9 | 6.30 |
| 20 | 7.903 | 0.90 | | | 6.00 |
| 21 | 20.964 | 1.50 | 1.48749 | 70.2 | 7.20 |
| 22 | −100.005 | 0.35 | | | 7.10 |
| 23 | ∞ | (variable) | | | 5.90 |
| 24 | −44.306 | 0.70 | 1.48749 | 70.2 | 7.40 |
| 25 | 63.018 | (variable) | | | 7.60 |
| 26 | 16.128 | 2.40 | 1.48749 | 70.2 | 9.60 |
| 27 | −26.827 | 0.60 | 1.77250 | 49.6 | 9.50 |
| 28 | −46.784 | (variable) | | | 9.50 |
| Image Plane | ∞ | | | | |

Aspherical Surface Data
Sixth Surface
K=−1.02055e+004 A4=−1.30281e−005 A6=1.29366e−007
Seventh Surface
K=−1.91728e−001 A4=−4.85642e−005 A6=−8.28741e−007
Sixteenth Surface
K=−1.40343e+000  A4=7.67948e−005  A6=1.34650e−007
    A8=−7.98130e−010
Seventeenth Surface
K=3.81603e+000 A4=8.57577e−005
Various Data
    Zoom Ratio 9.57

|  | Wide Angle | Intermediate | Telephoto |
|---|---|---|---|
| Focal length | 6.53 | 22.20 | 62.43 |
| F-number | 3.48 | 4.86 | 5.74 |
| Angle of view | 30.70 | 9.90 | 3.55 |
| Image height | 3.88 | 3.88 | 3.88 |
| Total lens length | 83.17 | 83.09 | 87.60 |
| BF | 8.89 | 12.41 | 7.68 |
| d5 | 0.95 | 8.35 | 15.47 |
| d11 | 11.01 | 3.60 | 1.00 |
| d13 | 1.00 | 1.00 | 1.00 |
| d15 | 14.82 | 3.97 | 0.35 |
| d23 | 2.75 | 13.60 | 17.23 |
| d25 | 8.27 | 4.69 | 9.43 |
| d28 | 8.89 | 12.41 | 7.68 |
| Entrance Pupil Position | 18.93 | 41.87 | 104.22 |
| Exit Pupil Position | −33.02 | −56.24 | −254.57 |
| Front principal Point | 24.44 | 56.89 | 151.79 |
| Rear Principal Point | 2.36 | −9.78 | −54.75 |

Zoom Lens Unit Data

| Unit | First Surface | Focal Length | Lens Length | Front Principal Point | Rear Principal Point |
|---|---|---|---|---|---|
| 1 | 1 | 31.98 | 7.40 | 1.69 | −3.04 |
| 2 | 6 | −8.32 | 7.40 | 0.39 | −5.71 |
| PR | 12 | ∞ | 8.50 | 2.32 | −2.32 |
| 3 | 14 | −112.02 | 0.60 | −1.48 | −1.91 |
| 4 | 16 | 16.34 | 7.85 | −0.91 | −6.85 |
| 5 | 24 | −53.25 | 0.70 | 0.19 | −0.28 |
| 6 | 26 | 28.00 | 3.00 | 0.43 | −1.56 |

Single Lens Data

| Lens | First Surface | Focal Length |
|---|---|---|
| 1 | 1 | −74.61 |
| 2 | 2 | 45.59 |
| 3 | 4 | 41.22 |
| 4 | 6 | −8.54 |
| 5 | 8 | −15.82 |
| 6 | 10 | 18.29 |
| 7 | 12 | 0.00 |
| 8 | 14 | −112.02 |
| 9 | 16 | 12.35 |
| 10 | 19 | −18.03 |
| 11 | 21 | 35.70 |
| 12 | 24 | −53.25 |
| 13 | 26 | 21.05 |
| 14 | 27 | −82.49 |

THIRD NUMERICAL EXAMPLE

Unit: mm
Surface Data

| Surface No. | r | d | nd | vd | Effective diameter |
|---|---|---|---|---|---|
| 1 | 52.692 | 1.25 | 1.84666 | 23.8 | 22.77 |
| 2 | 24.453 | 3.65 | 1.59201 | 67.0 | 22.06 |
| 3 | −314.042 | 0.08 |  |  | 21.93 |
| 4 | 22.322 | 2.97 | 1.77250 | 49.6 | 21.07 |
| 5 | 92.104 | (variable) |  |  | 20.52 |
| 6 | 996.194 | 0.75 | 1.88300 | 40.8 | 13.71 |
| 7 | 8.237 | 3.20 |  |  | 10.95 |
| 8 | −18.437 | 1.00 | 1.77250 | 49.6 | 10.83 |
| 9* | 29.095 | 0.05 |  |  | 10.95 |
| 10 | 17.970 | 1.59 | 1.94595 | 18.0 | 11.12 |
| 11 | −770.652 | (variable) |  |  | 11.04 |
| 12 | ∞ | 8.75 | 1.83400 | 37.2 | 8.65 |
| 13 | ∞ | (variable) |  |  | 7.71 |
| 14* | 7.589 | 3.12 | 1.58913 | 61.1 | 8.08 |
| 15 | −32.045 | 0.28 |  |  | 7.48 |
| 16 | −42.744 | 0.55 | 1.74950 | 35.3 | 7.23 |
| 17 | 13.097 | 1.68 |  |  | 6.89 |
| 18 | ∞ | 2.47 |  |  | 6.75 |
| (stop) |  |  |  |  |  |
| 19* | 11.489 | 2.84 | 1.497002 | 81.6 | 7.56 |
| 20 | −49.234 | 3.95 |  |  | 7.32 |
| 21 | −6.447 | 0.75 | 1.74320 | 49.3 | 6.76 |
| 22 | −10.771 | (variable) |  |  | 7.22 |
| 23* | 17.283 | 3.30 | 1.69350 | 53.2 | 10.52 |
| 24 | −37.586 | 0.60 | 1.84666 | 23.9 | 10.18 |
| 25 | −7541.539 | (variable) |  |  | 10.06 |
| Image Plane | ∞ |  |  |  |  |

Aspherical Surface Data
Ninth Surface
K=1.05465e+000 A4=−1.04012e−005 A6=−2.08392e−007
    A8=1.71915e−008 A10=−2.31090e−010
Fourteenth Surface
K=−3.14719e−001 A4=−3.46263e−005 A6=−5.27233e−007
    A8=−5.05083e−009
Nineteenth Surface
K=−4.94445e−001 A4=−6.46254e−005 A6=1.87297e−006
    A8=−8.20531e−008 A10=2.59845e−009
Twenty-Third Surface
K=−2.85212e+000  A4=7.06178e−005  A6=1.90757e−007
    A8=−3.71326e−009 A10=5.53717e−011
Various Data
    Zoom ratio 9.42

|  | Wide Angle | Intermediate | Telephoto |
|---|---|---|---|
| Focal length | 7.01 | 16.03 | 66.05 |
| F-number | 3.10 | 3.87 | 5.29 |
| Angle of view | 28.93 | 13.59 | 3.36 |
| Image height | 3.88 | 3.88 | 3.88 |
| Total lens length | 83.25 | 82.96 | 87.30 |
| BF | 6.25 | 8.84 | 4.18 |
| d5 | 0.80 | 6.01 | 13.95 |
| d11 | 9.90 | 4.41 | 0.81 |
| d13 | 17.38 | 9.47 | 1.30 |
| d22 | 6.09 | 11.40 | 24.22 |
| d25 | 6.25 | 8.84 | 4.18 |
| Entrance Pupil Position | 19.55 | 35.69 | 102.69 |
| Exit Pupil Position | −27.47 | −58.27 | 223.54 |
| Front principal Point | 25.10 | 47.89 | 188.63 |
| Rear Principal Point | −0.76 | −7.20 | −61.87 |

Zoom Lens Unit Data

| Unit | First Surface | Focal Length | Lens Length | Front Principal Point | Rear Principal Point |
|---|---|---|---|---|---|
| 1 | 1 | 29.62 | 7.95 | 1.96 | −2.78 |
| 2 | 6 | −8.15 | 6.59 | 0.60 | −4.43 |
| PR | 12 | ∞ | 8.75 | 2.39 | −2.39 |
| 3 | 14 | 18.73 | 15.64 | −4.27 | −13.85 |
| 4 | 23 | 27.42 | 3.90 | −0.21 | −2.46 |

Single Lens Data

| Lens | First Surface | Focal Length |
|---|---|---|
| 1 | 1 | −55.01 |
| 2 | 2 | 38.47 |
| 3 | 4 | 37.44 |
| 4 | 6 | −9.41 |
| 5 | 8 | −14.48 |
| 6 | 10 | 18.58 |
| 7 | 12 | 0.00 |
| 8 | 14 | 10.73 |
| 9 | 16 | −13.32 |
| 10 | 19 | 19.03 |
| 11 | 21 | −23.34 |
| 12 | 23 | 17.50 |
| 13 | 24 | −44.62 |

FOURTH NUMERICAL EXAMPLE

Unit: mm
Surface Data

| Surface No. | r | d | nd | vd | Effective diameter |
|---|---|---|---|---|---|
| 1 | 43.164 | 1.25 | 1.84666 | 23.8 | 23.45 |
| 2 | 22.500 | 3.63 | 1.59201 | 67.0 | 22.53 |
| 3 | 294.860 | 0.08 | | | 22.36 |
| 4 | 23.789 | 3.09 | 1.77250 | 49.6 | 21.65 |
| 5 | 116.383 | (variable) | | | 21.08 |
| 6 | 476.092 | 1.00 | 1.84862 | 40.0 | 13.39 |
| 7* | 7.550 | 2.99 | | | 10.11 |
| 8 | −16.254 | 0.75 | 1.77250 | 49.6 | 10.00 |
| 9 | 21.781 | 0.08 | | | 10.01 |
| 10 | 14.677 | 1.55 | 1.94595 | 18.0 | 10.17 |
| 11 | 510.339 | (variable) | | | 10.05 |
| 12 | ∞ | 8.75 | 1.83400 | 37.2 | 8.61 |
| 13 | ∞ | (variable) | | | 7.28 |
| 14 | −42.265 | 0.50 | 1.48749 | 70.2 | 7.01 |
| 15 | −85.761 | (variable) | | | 6.96 |
| 16* | 7.228 | 2.55 | 1.58913 | 61.1 | 7.77 |
| 17 | −50.715 | 0.14 | | | 7.30 |
| 18 | 78.471 | 0.55 | 1.80610 | 33.3 | 7.06 |
| 19 | 10.061 | 1.78 | | | 6.65 |
| 20 (stop) | ∞ | 3.18 | | | 6.53 |
| 21* | 11.789 | 2.51 | 1.497002 | 81.6 | 7.92 |
| 22 | −39.467 | 4.54 | | | 7.82 |
| 23 | −7.255 | 0.55 | 1.74320 | 49.3 | 7.29 |
| 24 | −10.395 | (variable) | | | 7.63 |
| 25* | 18.795 | 2.45 | 1.69350 | 53.2 | 10.38 |
| 26 | −41.100 | 0.55 | 1.84666 | 23.9 | 10.18 |
| 27 | 453.607 | (variable) | | | 10.08 |
| Image Plane | ∞ | | | | |

Aspherical Surface Data
Seventh Surface
K=1.96770e-001  A4=−2.31685e-005  A6=3.97075e-007
A8=−1.83993e-008 A10=7.05119e-010
Sixteenth Surface
K=−4.45643e-001  A4=−6.13487e-005  A6=−1.09451e-006
A8=2.78333e-009
Twenty-First Surface
K=−5.70223e-001  A4=−6.90837e-005  A6=2.19332e-006
A8=−1.30202e-007 A10=3.74301e-009
Twenty-Fifth Surface
K=4.34930e-001  A4=3.63367e-007  A6=−2.58112e-007
A8=8.93125e-009 A10=−5.95764e-011
Various Data
Zoom Ratio 9.62

| | Wide Angle | Intermediate | Telephoto |
|---|---|---|---|
| Focal length | 6.25 | 15.15 | 60.12 |
| F-number | 3.10 | 4.09 | 5.19 |
| Angle of view | 31.80 | 14.35 | 3.69 |
| Image height | 3.88 | 3.88 | 3.88 |
| Total lens length | 77.91 | 79.98 | 88.79 |
| BF | 5.32 | 10.52 | 4.05 |
| d5 | 0.70 | 5.13 | 15.46 |
| d11 | 4.69 | 2.33 | 0.82 |
| d13 | 1.20 | 1.20 | 1.20 |
| d15 | 16.34 | 5.11 | 0.50 |
| d24 | 7.20 | 13.22 | 24.31 |
| d27 | 5.32 | 10.52 | 4.05 |
| Entrance Pupil Position | 18.11 | 29.32 | 115.44 |
| Exit Pupil Position | −32.46 | −69.53 | 1027.60 |
| Front principal Point | 23.33 | 41.60 | 179.09 |
| Rear Principal Point | −0.93 | −4.63 | −56.07 |

Zoom Lens Unit Data

| Unit | First Surface | Focal Length | Lens Length | Front Principal Point | Rear Principal Point |
|---|---|---|---|---|---|
| 1 | 1 | 31.32 | 8.05 | 1.71 | −3.10 |
| 2 | 6 | −7.42 | 6.37 | 0.87 | −3.90 |
| PR | 12 | ∞ | 8.75 | 2.39 | −2.39 |
| 3 | 14 | −171.59 | 0.50 | −0.33 | −0.67 |
| 4 | 16 | 16.54 | 15.80 | −0.39 | −12.82 |
| 5 | 25 | 31.62 | 3.00 | −0.27 | −2.00 |

Single Lens Data

| Lens | First Surface | Focal Length |
|---|---|---|
| 1 | 1 | −57.09 |
| 2 | 2 | 40.94 |
| 3 | 4 | 38.15 |
| 4 | 6 | −9.05 |
| 5 | 8 | −11.95 |
| 6 | 10 | 15.95 |
| 7 | 12 | 0.00 |
| 8 | 14 | −171.59 |
| 9 | 16 | 10.92 |
| 10 | 18 | −14.37 |
| 11 | 21 | 18.56 |
| 12 | 23 | −34.93 |
| 13 | 25 | 18.91 |
| 14 | 26 | −44.49 |

FIFTH NUMERICAL EXAMPLE

Unit: mm
Surface Data

| Surface No. | r | d | nd | vd | Effective diameter |
|---|---|---|---|---|---|
| 1 | 52.929 | 1.25 | 1.84666 | 23.8 | 23.01 |
| 2 | 22.500 | 4.17 | 1.59201 | 67.0 | 22.08 |
| 3 | −117.920 | 0.08 | | | 21.93 |
| 4 | 18.978 | 3.29 | 1.77250 | 49.6 | 20.69 |
| 5 | 74.348 | (variable) | | | 20.03 |
| 6 | −498.733 | 0.75 | 1.88300 | 40.8 | 12.36 |
| 7 | 7.938 | 2.81 | | | 9.84 |
| 8 | −14.878 | 1.00 | 1.80400 | 46.6 | 9.66 |
| 9* | 19.752 | 0.25 | | | 9.69 |
| 10 | 16.652 | 1.54 | 1.94595 | 18.0 | 9.87 |
| 11 | −121.100 | (variable) | | | 9.81 |
| 12 | ∞ | 8.75 | 1.83400 | 37.2 | 8.73 |
| 13 | ∞ | (variable) | | | 7.54 |
| 14* | 7.607 | 3.04 | 1.58913 | 61.1 | 8.09 |
| 15 | −49.525 | 0.27 | | | 7.48 |
| 16 | −121.025 | 0.55 | 1.80610 | 33.3 | 7.26 |
| 17 | 13.127 | 1.68 | | | 6.93 |
| 18 (stop) | ∞ | 1.17 | | | 6.78 |
| 19* | 12.568 | 2.76 | 1.497002 | 81.6 | 7.36 |
| 20 | −42.076 | 5.77 | | | 7.24 |
| 21 | −6.007 | 0.75 | 1.74320 | 49.3 | 6.74 |
| 22 | −9.612 | (variable) | | | 7.27 |
| 23* | 20.145 | 3.03 | 1.69350 | 53.2 | 11.44 |
| 24 | −17.946 | 0.60 | 1.84666 | 23.9 | 11.33 |
| 25 | −41.013 | (variable) | | | 11.30 |
| Image Plane | ∞ | | | | |

Aspherical Surface Data

Ninth Surface
K=1.04420e+000  A4=−2.74642e-005  A6=−5.52019e-007
  A8=5.08695e-008 A10=−8.09891e-010

Fourteenth Surface
K=−3.36757e-001  A4=−4.19316e-005  A6=−8.29043e-007
  A8=1.91167e-010

Nineteenth Surface
K=−7.37139e-001  A4=−8.58520e-005  A6=3.73678e-006
  A8=−2.43327e-007 A10=7.09292e-009

Twenty-Third Surface
K=−4.08726e+000  A4=7.05771e-005  A6=−4.11534e-007
  A8=1.38957e-008 A10=−2.28389e-010

Various Data
  Zoom Ratio 9.86

| | Wide Angle | Intermediate | Telephoto |
|---|---|---|---|
| Focal length | 7.20 | 11.77 | 71.01 |
| F-number | 3.10 | 3.56 | 5.56 |
| Angle of view | 28.29 | 18.23 | 3.12 |
| Image height | 3.88 | 3.88 | 3.88 |
| Total lens length | 78.97 | 78.81 | 87.41 |
| BF | 7.13 | 9.29 | 3.99 |
| d5 | 0.89 | 3.21 | 11.45 |
| d11 | 4.95 | 2.47 | 0.81 |
| d13 | 17.56 | 12.19 | 1.30 |
| d22 | 4.95 | 8.13 | 24.33 |
| d25 | 7.13 | 9.29 | 3.99 |
| Entrance Pupil Position | 19.82 | 26.88 | 102.18 |
| Exit Pupil Position | −32.87 | −61.91 | 66.83 |
| Front principal Point | 25.72 | 36.70 | 253.43 |
| Rear Principal Point | −0.07 | −2.47 | −67.02 |

Zoom Lens Unit Data

| Unit | First Surface | Focal Length | Lens Length | Front Principal Point | Rear Principal Point |
|---|---|---|---|---|---|
| 1 | 1 | 24.85 | 8.79 | 2.37 | −2.88 |
| 2 | 6 | −6.87 | 6.35 | 0.68 | −4.16 |
| PR | 12 | ∞ | 8.75 | 2.39 | −2.39 |
| 3 | 14 | 17.58 | 15.97 | −5.59 | −14.26 |
| 4 | 23 | 21.92 | 3.63 | 0.62 | −1.54 |

Single Lens Data

| Lens | First Surface | Focal Length |
|---|---|---|
| 1 | 1 | −47.11 |
| 2 | 2 | 32.27 |
| 3 | 4 | 32.16 |
| 4 | 6 | −8.84 |
| 5 | 8 | −10.42 |
| 6 | 10 | 15.56 |
| 7 | 12 | 0.00 |
| 8 | 14 | 11.42 |
| 9 | 16 | −14.66 |
| 10 | 19 | 19.80 |
| 11 | 21 | −23.65 |
| 12 | 23 | 14.15 |
| 13 | 24 | −38.14 |

TABLE 1

| | Expression (1) | Expression (2) | Expression (3) | Expression (4) | Expression (5) | Expression (6) | Expression (7) |
|---|---|---|---|---|---|---|---|
| Example 1 | 0.38 | 0.49 | 0.076 | 3.17 | 0.23 | 0.25 | 0.123 |
| Example 2 | 0.30 | 0.51 | 0.074 | 4.88 | 0.23 | 0.26 | 0.123 |
| Example 3 | 0.28 | 0.45 | 0.072 | 2.73 | 0.20 | 0.28 | 0.123 |
| Example 4 | 0.75 | 0.52 | 0.079 | 3.18 | 0.25 | 0.24 | 0.123 |
| Example 5 | 0.42 | 0.35 | 0.067 | 2.48 | 0.15 | 0.28 | 0.097 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-199919 filed Aug. 31, 2009, which is hereby incorporated by reference herein in its entirety.

What is claimed is:

1. A zoom lens comprising:
a first lens unit having a positive refractive power;
a second lens unit having a negative refractive power;
a reflecting prism for bending an optical path; and
a rear lens group including a plurality of lens units,
wherein the first lens unit, the second lens unit, the reflecting prism, and the rear lens group are arranged in order from an object side to an image side,
wherein at least the first and second lens units move for zooming,
wherein, during retraction into a storage state, the reflecting prism moves to a position different from a position in an image taking state, and at least a part of the first lens unit and the second lens unit is retracted and stored in a space formed by the movement of the reflecting prism, and
wherein the following conditions are satisfied:

$$0.25 < |m1|/(DL1+DL2) < 0.76$$

$$0.25 < f1/ft < 0.55$$

where DL1 and DL2 represent thicknesses of the first lens unit and the second lens unit on an optical axis, respectively, m1 represents a moving amount of the first lens unit during zooming from a wide angle end to a telephoto end, f1 represents a focal length of the first lens unit, and ft represents a focal length of the entire zoom lens at the telephoto end.

2. The zoom lens according to claim 1, wherein the following conditional expression is satisfied:

$$0.050 < Lpr/(Npr \cdot ft) < 0.100$$

where Lpr and Npr respectively represent a thickness of the reflecting prism in an optical axis direction and a refractive index of a material of the reflecting prism.

3. The zoom lens according to claim 1, wherein the reflecting prism moves in a direction perpendicular to the optical axis of the first and second lens units during retraction into the storage state.

4. The zoom lens according to claim 1, wherein the reflecting prism does not move relative to an image plane for zooming.

5. The zoom lens according to claim 1,
wherein the first lens unit includes a negative lens, and
wherein the following conditional expression is satisfied:

$$0.00 < (R1+R2)/(R1-R2) < 6.00$$

where R1 and R2 represent radii of curvature of an object-side lens surface and an image-side lens surface of the negative lens, respectively.

6. The zoom lens according to claim 1, wherein the following conditional expression is satisfied:

$$0.10 < (m2-m1)/ft < 0.28$$

where m2 represents a moving amount of the second lens unit during zooming from the wide angle end to the telephoto end.

7. The zoom lens according to claim 1, wherein the following conditional expression is satisfied:

$$0.05 < |f2|/ft < 0.29$$

where |f2| represents the absolute value of a focal length of the second lens unit.

8. The zoom lens according to claim 1, wherein the following conditional expression is satisfied:

$$0.15 < Zr/Z < 0.30$$

where Zr and Z represent zoom ratios of the rear lens group and the entire zoom lens, respectively.

9. The zoom lens according to claim 1, wherein the rear lens group includes, in order from the object side to the image side, a third lens unit having a negative refractive power, a fourth lens unit having a positive refractive power, and a fifth lens unit having a positive refractive power.

10. The zoom lens according to claim 1, wherein the rear lens group includes, in order from the object side to the image side, a third lens unit having a negative refractive power, a fourth lens unit having a positive refractive power, a fifth lens unit having a negative refractive power, and a sixth lens unit having a positive refractive power.

11. The zoom lens according to claim 1, wherein the rear lens group includes, in order from the object side to the image side, a third lens unit having a positive refractive power and a fourth lens unit having a positive refractive power.

12. An image pickup apparatus comprising:
a zoom lens; and
a solid-state image pickup element configured to receive an image formed by the zoom lens,
wherein the zoom lens includes
a first lens unit having a positive refractive power, a second lens unit having a negative refractive power, a reflecting prism for bending an optical path, and a rear lens group including a plurality of lens units,
wherein the first lens unit, the second lens unit, the reflecting prism, and the rear lens group are arranged in order from an object side to an image side,
wherein at least the first and second lens units move for zooming,
wherein, during retraction into a storage state, the reflecting prism moves to a position different from a position in an image taking state, and at least a part of the first lens unit and the second lens unit is retracted and stored in a space formed by the movement of the reflecting prism, and
wherein the following conditions are satisfied:

$$0.25 < |m1|/(DL1+DL2) < 0.76$$

$$0.25 < f1/ft < 0.55$$

where DL1 and DL2 represent thicknesses of the first lens unit and the second lens unit on an optical axis, respectively, m1 represents a moving amount of the first lens unit during zooming from a wide angle end to a telephoto end, f1 represents a focal length of the first lens unit, and ft represents a focal length of the entire zoom lens at the telephoto end.

13. A zoom lens configured to transition between an image taking state and a storage state, comprising:
a first lens unit having a positive refractive power;
a second lens unit having a negative refractive power;
a reflecting prism for bending an optical path; and
a rear lens group including a plurality of lens units, wherein the first lens unit, the second lens unit, the reflecting prism, and the rear lens group are arranged along an optical axis in order from an object side to an image side, wherein at least the first and second lens units move during a zooming operation of the zoom lens, wherein, when the zoom lens transitions to the storage state, the reflecting prism moves to a position different from a position in the image taking state, and at least part of the first lens unit and the second lens unit is retracted and stored in a space formed by the movement of the reflecting prism, and wherein $0.25 < |m1|/(DL1+DL2) < 0.76$ and $0.25 < f1/ft < 0.55$ are true, where DL1 and DL2 represent thicknesses of the first lens unit and the second lens unit on an optical axis, respectively, m1 represents a moving amount of the first lens unit during zooming from a wide angle end to a telephoto end, f1 represents a focal length of the first lens unit, and ft represents a focal length of the entire zoom lens at the telephoto end.

* * * * *